US012699249B2

(12) United States Patent
Lee

(10) Patent No.: US 12,699,249 B2
(45) Date of Patent: Aug. 4, 2026

(54) LENS DRIVING DEVICE WITH A MAGNET ADHERED TO AN ELASTIC MEMBER

(71) Applicant: LG INNOTEK CO., LTD., Seoul (KR)

(72) Inventor: Jun Taek Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 67 days.

(21) Appl. No.: 18/770,057

(22) Filed: Jul. 11, 2024

(65) Prior Publication Data

US 2024/0377608 A1 Nov. 14, 2024

Related U.S. Application Data

(63) Continuation of application No. 18/303,207, filed on Apr. 19, 2023, now Pat. No. 12,066,692, which is a
(Continued)

(30) Foreign Application Priority Data

| Sep. 8, 2015 | (KR) | ........................ 10-2015-0127249 |
| Oct. 19, 2015 | (KR) | ........................ 10-2015-0145242 |

(51) Int. Cl.
*G02B 7/09* (2021.01)
*G02B 7/08* (2021.01)
(Continued)

(52) U.S. Cl.
CPC ................. *G02B 7/09* (2013.01); *G02B 7/08* (2013.01); *G02B 27/646* (2013.01); *G03B 3/10* (2013.01);
(Continued)

(58) Field of Classification Search
CPC .......... G02B 7/09; G02B 27/646; G02B 7/08; G03B 3/10; G03B 17/02; G03B 19/22;
(Continued)

(56) References Cited

U.S. PATENT DOCUMENTS

| 11,086,098 B2 | 8/2021 | Lee |
| 2007/0047108 A1 | 3/2007 | Chang et al. |

(Continued)

FOREIGN PATENT DOCUMENTS

| CN | 101210992 A | 7/2008 |
| CN | 201489175 U | 5/2010 |

(Continued)

OTHER PUBLICATIONS

Notice of Allowance dated Apr. 11, 2024 in U.S. Appl. No. 18/303,207.
(Continued)

*Primary Examiner* — Gevell V Selby
(74) *Attorney, Agent, or Firm* — SALIWANCHIK, LLOYD & EISENSCHENK

(57) ABSTRACT

The present embodiment relates to a dual camera module comprising: a substrate; a first image sensor disposed on the substrate; a second image sensor disposed on the substrate while being spaced apart from the first image sensor; a housing disposed on the upper side of the substrate; a first bobbin disposed on the upper side of the first image sensor inside the housing; a second bobbin disposed on the upper side of the second image sensor inside the housing; a first coil disposed in the first bobbin; a second coil disposed in the second bobbin; and a first magnet which is disposed between the first coil and the second coil and faces the first coil and the second coil.

20 Claims, 17 Drawing Sheets

Related U.S. Application Data continuation of application No. 17/369,251, filed on Jul. 7, 2021, now Pat. No. 11,662,549, which is a continuation of application No. 16/685,286, filed on Nov. 15, 2019, now Pat. No. 11,086,098, which is a continuation of application No. 15/758,685, filed as application No. PCT/KR2016/009992 on Sep. 7, 2016, now Pat. No. 10,509,194.

(51) Int. Cl.

| | |
|---|---|
| *G02B 27/64* | (2006.01) |
| *G03B 3/10* | (2021.01) |
| *G03B 5/00* | (2021.01) |
| *G03B 13/36* | (2021.01) |
| *G03B 17/02* | (2021.01) |
| *G03B 19/22* | (2021.01) |
| *H04N 23/45* | (2023.01) |
| *H04N 23/54* | (2023.01) |
| *H04N 23/55* | (2023.01) |
| *H04N 23/57* | (2023.01) |
| *H04N 23/68* | (2023.01) |
| *H04N 23/90* | (2023.01) |

(52) U.S. Cl.
CPC .............. *G03B 5/00* (2013.01); *G03B 13/36* (2013.01); *G03B 17/02* (2013.01); *G03B 19/22* (2013.01); *H04N 23/45* (2023.01); *H04N 23/54* (2023.01); *H04N 23/55* (2023.01); *H04N 23/57* (2023.01); *H04N 23/687* (2023.01); *H04N 23/90* (2023.01); *G03B 2205/0007* (2013.01); *G03B 2205/0069* (2013.01)

(58) Field of Classification Search
CPC .. G03B 5/00; G03B 13/36; G03B 2205/0007; G03B 2205/0069; H04N 5/2258; H04N 5/23287; H04N 5/2257; H04N 5/2254; H04N 5/2253; H04N 5/247
See application file for complete search history.

(56) References Cited

U.S. PATENT DOCUMENTS

| | | | |
|---|---|---|---|
| 2009/0015948 A1 | 1/2009 | Wada et al. | |
| 2012/0008220 A1* | 1/2012 | Lee ......................... | H04N 23/51 |
| | | | 359/822 |
| 2012/0025633 A1* | 2/2012 | Lee ......................... | H04N 23/51 |
| | | | 310/12.16 |
| 2012/0082442 A1* | 4/2012 | Kwon .................... | H04N 23/55 |
| | | | 396/55 |
| 2012/0146432 A1* | 6/2012 | Kim ......................... | G03B 3/10 |
| | | | 310/12.16 |
| 2012/0314307 A1* | 12/2012 | Ikushima ................. | G02B 7/08 |
| | | | 359/814 |
| 2013/0194490 A1 | 8/2013 | Okuyama et al. | |
| 2014/0072289 A1 | 3/2014 | Lim et al. | |
| 2014/0118854 A1 | 5/2014 | Kirii | |
| 2015/0070781 A1 | 3/2015 | Cheng et al. | |
| 2015/0177479 A1 | 6/2015 | Lee et al. | |

| | | | |
|---|---|---|---|
| 2015/0316744 A1 | 11/2015 | Chen | |
| 2016/0048033 A1 | 2/2016 | Kim et al. | |
| 2016/0316150 A1 | 10/2016 | Eromäki | |
| 2017/0094180 A1 | 3/2017 | Miller et al. | |

FOREIGN PATENT DOCUMENTS

| | | | |
|---|---|---|---|
| CN | 103576418 A | 2/2014 | |
| CN | 103792644 A | 5/2014 | |
| CN | 104267559 A | 1/2015 | |
| CN | 104730678 A | 6/2015 | |
| CN | 104834158 A | 8/2015 | |
| CN | 109188641 A | 1/2019 | |
| JP | 2012-504254 A | 2/2012 | |
| KR | 10-2011-0055932 A | 5/2011 | |
| KR | 10-1083423 B1 | 11/2011 | |
| KR | 10-2011-0135502 A | 12/2011 | |
| KR | 10-1132209 B1 | 3/2012 | |
| KR | 10-2012-0100509 A | 9/2012 | |
| KR | 10-1321799 B1 | 10/2013 | |
| KR | 10-1366662 B1 | 2/2014 | |
| KR | 10-2015-0064471 A | 6/2015 | |
| KR | 10-2015-0090410 A | 8/2015 | |
| WO | 2012/144687 A1 | 10/2012 | |
| WO | 2015/124966 A1 | 8/2015 | |

OTHER PUBLICATIONS

Office Action dated Nov. 22, 2023 in U.S. Appl. No. 18/303,207.
International Search Report in International Application No. PCT/KR2016/009992, filed Sep. 7, 2016.
Office Action dated Mar. 21, 2019 in U.S. Appl. No. 15/758,685.
Notice of Allowance dated Aug. 15, 2019 in U.S. Appl. No. 15/758,685.
Office Action dated Feb. 21, 2020 in Chinese Application No. 201680052132.6.
Office Action dated Nov. 4, 2020 in Chinese Application No. 201680052132.6.
Yu, H. et al., "Design of a Voice Coil Motor Used in the Focusing System of a Digital Video Camera," IEEE Transactions on Magnetics, Oct. 2005, 41(10): 3979-3981, IEEE.
Shouwang, Y. et al., "Image scanning system of aerial camera based on VCM," Infrared and Laser Engineering, May 2014, 43(5):1540-1544, China Academic Journal Electronic Publishing House, along with its English abstract.
Office Action dated Nov. 25, 2020, in U.S. Appl. No. 16/685,286.
Notice of Allowance dated Apr. 7, 2021 in U.S. Appl. No. 16/685,286.
Notice of Allowance dated Sep. 27, 2022 in Korean Application No. 10-2015-0145242.
Office Action dated Aug. 26, 2022 in Korean Application No. 10-2015-0127249.
Office Action dated Dec. 27, 2022 in Chinese Application No. 202110838972.8.
Office Action dated Jan. 9, 2023 in Chinese Application No. 202110837421.X.
Office Action dated Feb. 22, 2023 in Korean Application No. 10-2015-0127249.
Office Action dated Aug. 31, 2022 in U.S. Appl. No. 17/369,251.
Notice of Allowance dated Jan. 19, 2023 in U.S. Appl. No. 17/369,251.
Office Action dated May 16, 2024 in Korean Application No. 10-2023-0125157.

* cited by examiner

FIG 1

LENS DRIVING DEVICE WITH A MAGNET ADHERED TO AN ELASTIC MEMBER

CROSS-REFERENCE TO RELATED APPLICATIONS

This application is a continuation of U.S. application Ser. No. 18/303,207, filed Apr. 19, 2023; which is a continuation of U.S. application Ser. No. 17/369,251, filed Jul. 7, 2021, now U.S. Pat. No. 11,662,549, issued May 30, 2023; which is a continuation of U.S. application Ser. No. 16/685,286, filed Nov. 15, 2019, now U.S. Pat. No. 11,086,098, issued Aug. 10, 2021; which is a continuation of U.S. application Ser. No. 15/758,685, filed Mar. 8, 2018, now U.S. Pat. No. 10,509,194, issued Dec. 17, 2019; which is the U.S. national stage application of International Patent Application No. PCT/KR2016/009992, filed Sep. 7, 2016, which claims priority to Korean Application Nos. 10-2015-0127249, filed Sep. 8, 2015, and 10-2015-0145242, filed Oct. 19, 2015, the disclosures of each of which are incorporated herein by reference in their entirety.

TECHNICAL FIELD

The teachings in accordance with exemplary and non-limiting embodiments of this invention relate generally to a dual camera module and optical device.

BACKGROUND ART

This section provides background information related to the present disclosure, which is not necessarily prior art.

Concomitant with widely generalized dissemination of various mobile terminals and commercialization of wireless Internet services, demands by consumers related to mobile terminals are diversified to prompt various types of circumferential devices or additional equipment to be mounted on mobile terminals. Inter alia, camera modules may be representative items photographing an object in a still picture or a video.

Recently, as one kind of camera module, a dual camera module has been developed that is capable of obtaining a high quality photograph or image through a digital zoom to a short distance subject and even to a long distance subject. However, the dual camera module suffers from disadvantages/problems in that parts costs are increased and a time consumed for manufacturing takes long hours, when two lens driving units separately manufactured to configure a dual camera module are used. Furthermore, the conventional camera module has suffered disadvantages/problems in that complicated processes are required in fixing a magnet and coupling an elastic member, and foreign objects can be generated during assembly processes.

DETAILED DESCRIPTION OF THE INVENTION

Technical Subject

A first exemplary embodiment of the present invention is to provide a dual camera module configured to reduce a parts manufacturing cost and a manufacturing loss. Furthermore, the first exemplary embodiment of the present invention is to provide an optical device including a dual camera module.

A second exemplary embodiment of the present invention is to provide a lens driving apparatus configured to fix an elastic member using a force coupling a magnet to a housing. Furthermore, the second exemplary embodiment of the present invention is to provide a lens driving apparatus applied with a foreign object reinforcement structure for prevention of penetration of foreign objects into a housing. Still furthermore, an exemplary embodiment of the present invention is to provide a camera module including a lens driving apparatus and an optical device.

Technical Solution

In one general aspect of the present invention, there is provided a dual camera module, comprising: a substrate; a first image sensor disposed on the substrate; a second image sensor disposed on the substrate while being spaced apart from the first image sensor; a housing disposed above the substrate; a first bobbin disposed above the first image sensor inside the housing; a second bobbin disposed above the second image sensor inside the housing; a first coil disposed on the first bobbin; a second coil disposed on the second bobbin; and a first magnet disposed between the first coil and the second coil and facing the first coil and the second coil.

Preferably, but not necessarily, the housing may include a partition wall dividing an inner space of the housing to a first space and a second space, wherein the first bobbin may be disposed on the first space and the second bobbin may be disposed on the second space.

Preferably, but not necessarily, the first magnet may be so arranged as to overlap with the partition wall to an optical axis direction.

Preferably, but not necessarily, the housing may further include a first magnet accommodation portion disposed on a bottom side of the partition wall to accommodate the first magnet, wherein the first magnet accommodation portion may be of a bottom-opened type.

Preferably, but not necessarily, the dual camera module may further comprise: a second magnet disposed on the housing and facing the first coil; and a third magnet disposed on the housing and facing the second coil, wherein the housing may include a second magnet accommodation portion penetratingly formed at a lateral surface in an inner-outer side opened type to accommodate the second magnet, and a third magnet accommodation portion penetratingly formed at a lateral surface in an inner-outer side opened type to accommodate the third magnet.

Preferably, but not necessarily, the dual camera module may further comprise: a second magnet disposed on the housing to face the first magnet; and a third magnet disposed on the housing to face the second coil, wherein the housing may include a second magnet accommodation portion formed at a lateral surface in a bottom side opened type to accommodate the second magnet, and a third magnet accommodation portion formed at a lateral surface in a bottom side opened type to accommodate the third magnet.

Preferably, but not necessarily, the dual camera module may further comprise a first elastic member coupled to the second bobbin and the housing, wherein the elastic member is integrally formed.

Preferably, but not necessarily, the dual camera module may further comprise a second elastic member coupled to the first bobbin and the housing; and a third elastic member coupled to the second bobbin and the housing, wherein the second elastic member is divided to a pair to be electrically connected to the first coil, and the third elastic member is divided to a pair to be electrically connected to the second coil.

Preferably, but not necessarily, the dual camera module may further comprise a base interposed between the substrate and the housing and integrally formed, wherein the base includes a first opening portion corresponding to the first bobbin and a second opening portion corresponding to the second bobbin.

Preferably, but not necessarily, a bottom surface of the base may be formed with a partition wall interposed between the first opening portion and the second opening portion to protrusively formed to a bottom side, wherein the partition wall may be extended from a lateral side of one side of the bottom surface of the base to a lateral side of the other side.

Preferably, but not necessarily, the dual camera module may further comprise a cover member accommodating the housing at an inside and integrally formed, wherein the cover member may include a first through hole corresponding to the first bobbin and a second through hole corresponding to the second bobbin.

Preferably, but not necessarily, an inner lateral surface of the second magnet and an inner lateral surface of the third magnet may have a mutually different polarity.

Preferably, but not necessarily, the first magnet may include mutually-separated two magnets, and a shield plate shielding an electromagnetic force may be disposed between the two magnets.

Preferably, but not necessarily, an inner lateral surface of the second magnet and an inner lateral surface of the third magnet may have a mutually same polarity.

In another genera aspect of the present invention, there is provided an optical device including a main body, a dual camera module disposed on the main body to photograph an image of a subject and a display portion disposed on one surface of the main body to output the image photographed by the dual camera module, wherein the dual camera module comprise: a substrate; a first image sensor disposed on the substrate; a second image sensor disposed on the substrate while being spaced apart from the first image sensor; a housing disposed on the upper side of the substrate; a first bobbin disposed on the upper side of the first image sensor inside the housing; a second bobbin disposed on the upper side of the second image sensor inside the housing; a first coil disposed in the first bobbin; a second coil disposed in the second bobbin; and a first magnet which is disposed between the first coil and the second coil and faces the first coil and the second coil.

Advantageous Effects

Parts manufacturing costs and manufacturing losses can be reduced through a first exemplary embodiment of the present invention. The manufacturing processes of lens driving device can be simplified through a second exemplary embodiment of the present invention, and an effect of reducing manufacturing personnel, jig costs, manufacturing costs and defects can be expected. Furthermore, generation in and penetration of foreign objects into the lens driving device can be minimized.

BRIEF DESCRIPTION OF DRAWINGS

FIG. 1 is a perspective view illustrating a camera module according to a first exemplary embodiment of the present invention.

BEST MODE

Figure 2:
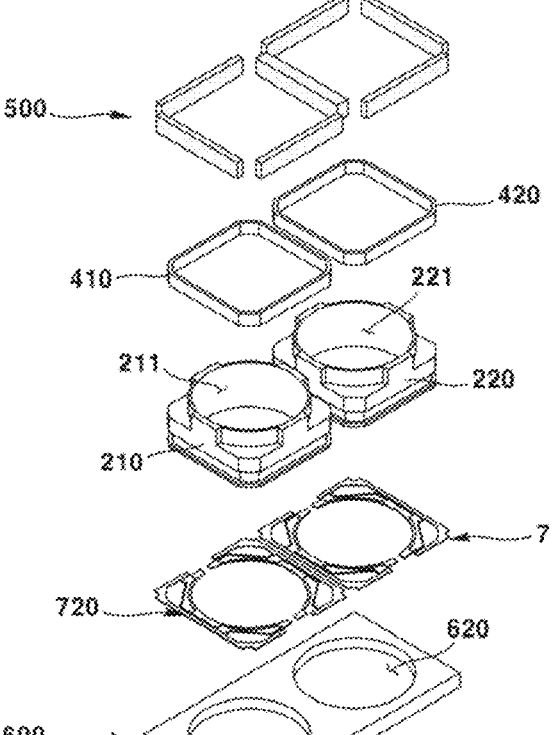
FIG. 2 is an exploded perspective view illustrating a dual camera module according to a first exemplary embodiment of the present invention.

Now, some of the exemplary embodiments of the present invention will be described with the accompanying drawings.

Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

An "optical axis direction" as used hereinafter may be defined as an optical axis direction of a lens module in a state of being coupled to a lens driving unit. Meantime, "optical axis direction" may be interchangeably used with a vertical direction and z axis direction.

An "auto focus function" as used hereinafter may be defined as a function of matching a focus relative to a subject by adjusting a distance from an image sensor by moving a lens module to an optical axis direction in response to a distance to a subject in order to obtain a clear image of a subject on an image sensor. Hereinafter, the "auto focus" may be interchangeably used with "AF".

A "handshake correction function" as used hereinafter may be defined as a function of moving or tilting a lens module to a direction perpendicular to an optical axis direction in order to offset vibration (movement) generated on the image sensor by an external force. Meantime, the "handshake correction" may be interchangeably used with an "OIS (Optical Image Stabilization)".

A lens driving device (1000) according to a second exemplary embodiment of the present invention may be applied to a dual camera module according to a first exemplary embodiment of the present invention. To be more specific, arrangement in parallel of two lens driving devices (1000) on a PCB (Printed Circuit Board) according to a second exemplary embodiment of the present invention may be applied to a dual camera module according to a first exemplary embodiment of the present invention.

Now, a configuration of an optical device according to a first exemplary embodiment of the present invention will be described hereinafter.

The optical device according to the exemplary embodiment of the present invention may be a hand phone, a mobile phone, a smart phone, a portable smart device, a digital camera, a notebook computer (laptop computer), a PMP (Portable Multimedia Player) and a navigation device. However, the present invention is not limited thereto, and any device may be called an optical device capable of photographing an image or a photograph.

The optical device may include a main body (not shown), a dual camera module and a display portion (not shown). However, any one or more of the main body, the dual camera module and the display portion may be omitted or changed from the optical device. The main body may form an external look of the optical device. For example, the main body may include a cubic shape. In another example, the main body may be formed at least at some areas with a round shape. The main body may accommodate a dual camera module. One surface of the main body may be disposed with a display portion. For example, one surface of the main body may be disposed with a display portion and camera module, and the other surface (opposite surface of the one surface) of the main body may be additionally disposed with a dual camera module.

The dual camera module may be disposed on the main body. The dual camera module may be disposed on one surface of the main body. At least a part of the dual camera module may be accommodated into the main body. The dual camera module may be formed in a plural number. Alternatively, a dual camera module and a camera module (camera module with one image sensor) may be integrally formed. For example, a camera module may be disposed on a front surface of the main body and a dual camera module may be disposed on a rear surface of the main body. The plurality of camera modules may be respectively disposed on one surface of the main body and the other surface of the main body. The dual camera module can photograph an image of a subject.

The display portion may be disposed on the main body. The display portion may be disposed on one surface of the main body. That is, the display portion may be disposed on the same surface as that of the dual camera module. Alternatively, the display portion may be disposed on the other surface of the main body. The display portion may be disposed on a surface of a main body opposite to a surface where the dual camera module is disposed. The display portion may output an image photographed by the dual camera module.

Hereinafter, a configuration of a dual camera module according to a first exemplary embodiment of the present invention will be described.

Figure 1:
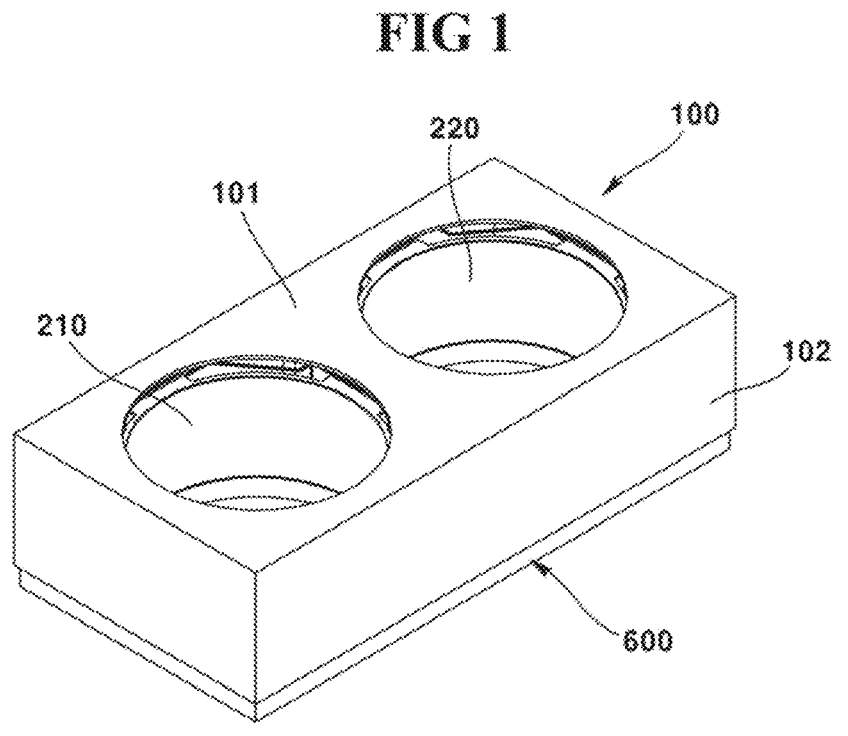
Figure 3:
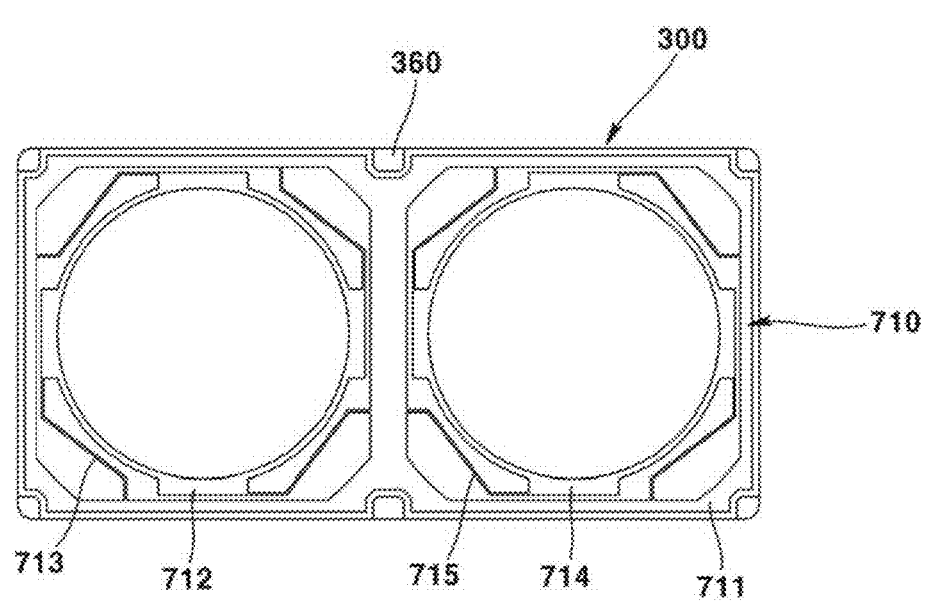
FIG. 3 is a plane view illustrating a housing and a first elastic member of a dual camera module apparatus according to a first exemplary embodiment of the present invention.
Figure 4:
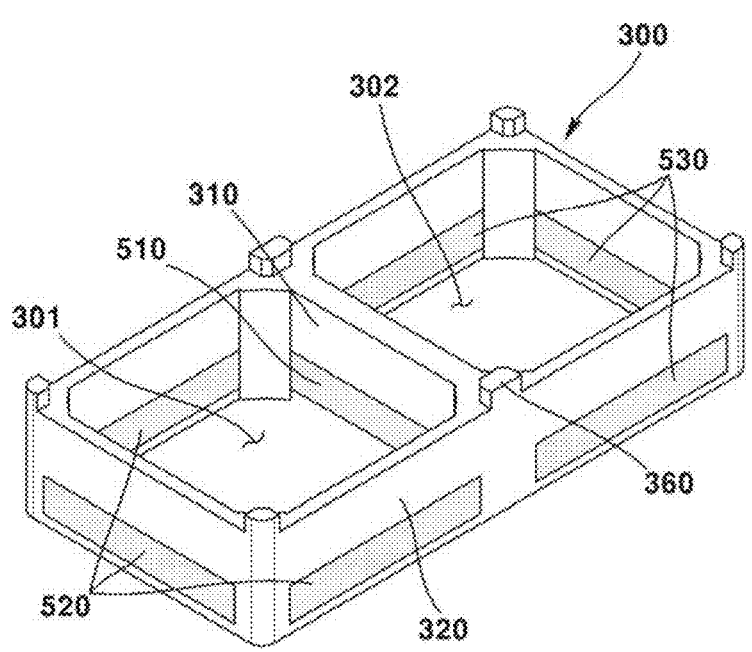
FIG. 4 is a perspective view illustrating a housing and a magnet of a dual camera module according to a first exemplary embodiment of the present invention.
Figure 5:
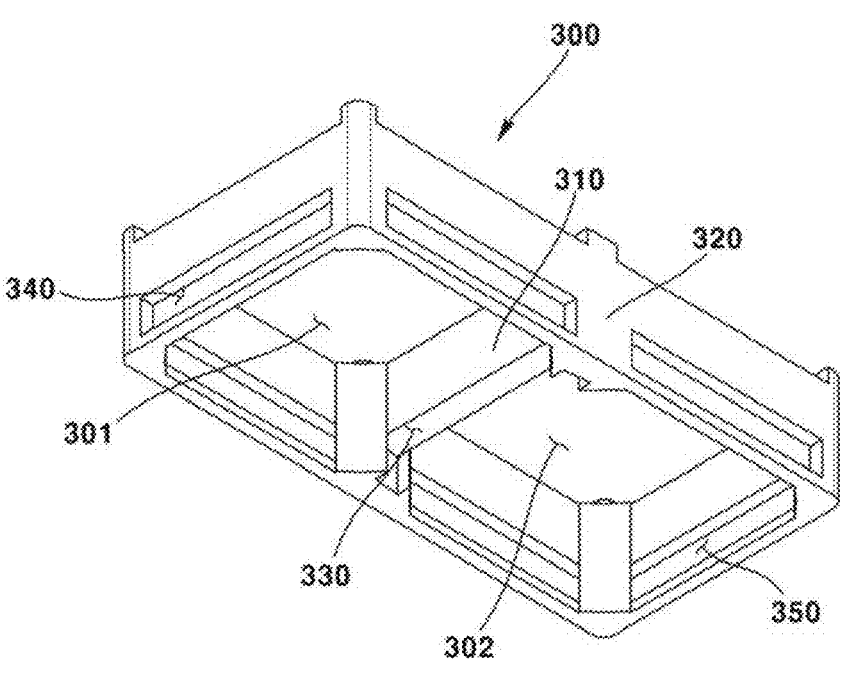
FIG. 5 is a perspective view of bottom surface illustrating a housing of a dual camera module according to a first exemplary embodiment of the present invention.
Figure 6:
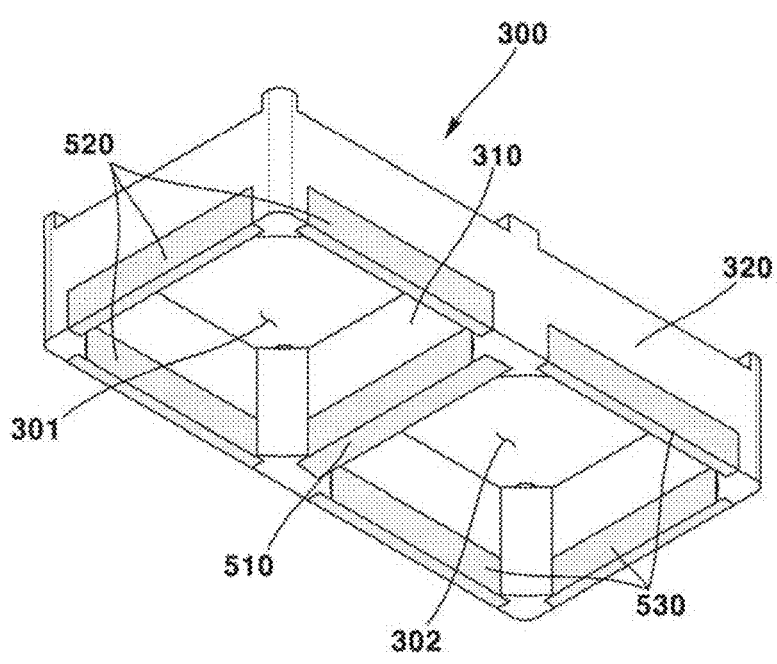
FIG. 6 is a perspective view of bottom surface illustrating a housing and a magnet of a dual camera module according to a modification of the present invention.
Figures 7A, 7B:
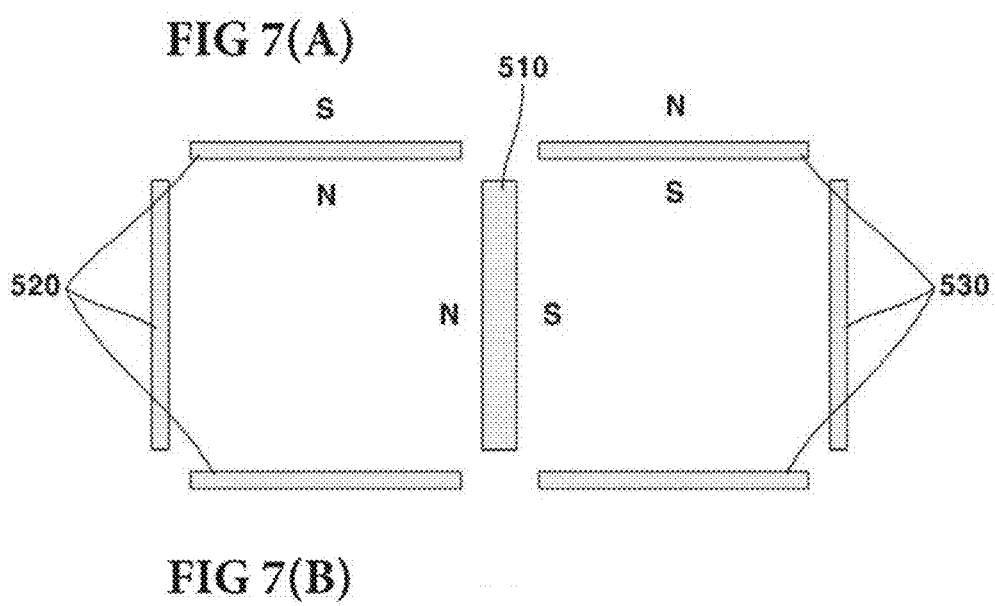
FIG. 7(a) is a plane view illustrating a polarity arrangement of a magnet in a dual camera module according to a first exemplary embodiment of the present invention.
FIG. 7(b) is illustrating a polarity arrangement of a magnet in a dual camera module according to a modification of the present invention.
Figure 8:
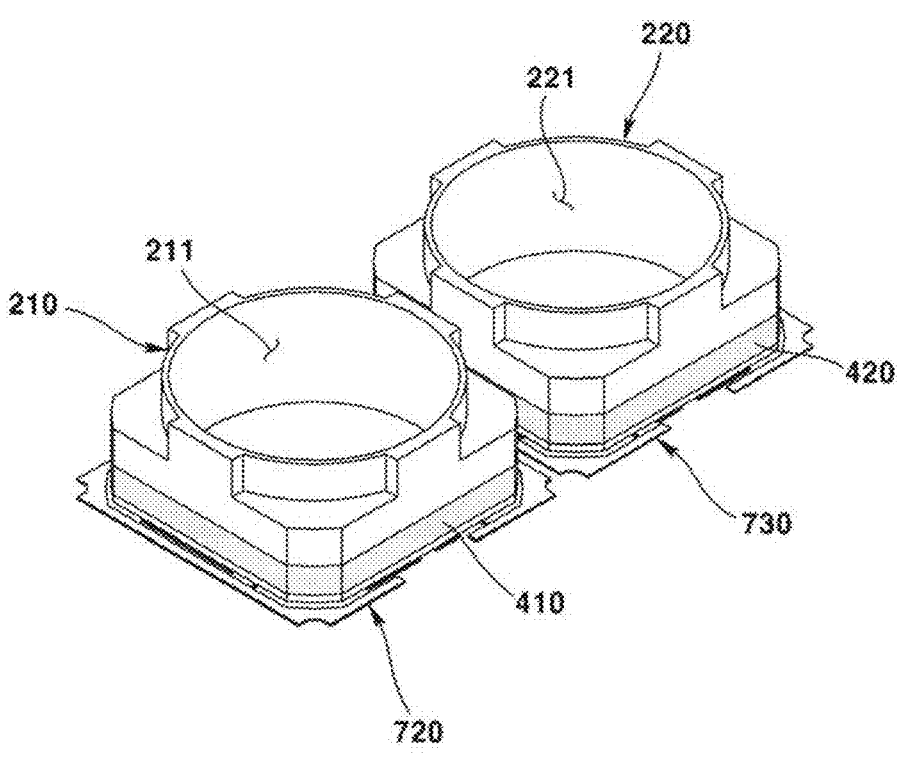
FIG. 8 is a perspective view illustrating a bobbin, a coil and an elastic member of a dual camera module according to a first exemplary embodiment of the present invention.
Figure 9:
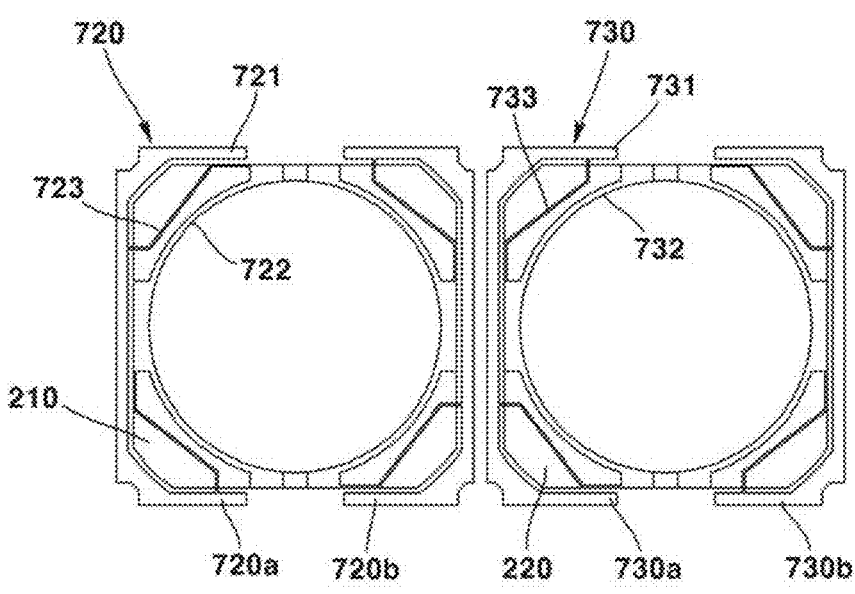
FIG. 9 is a bottom view illustrating a bobbin and an elastic member of a dual camera module according to a first exemplary embodiment of the present invention.
Figure 10:
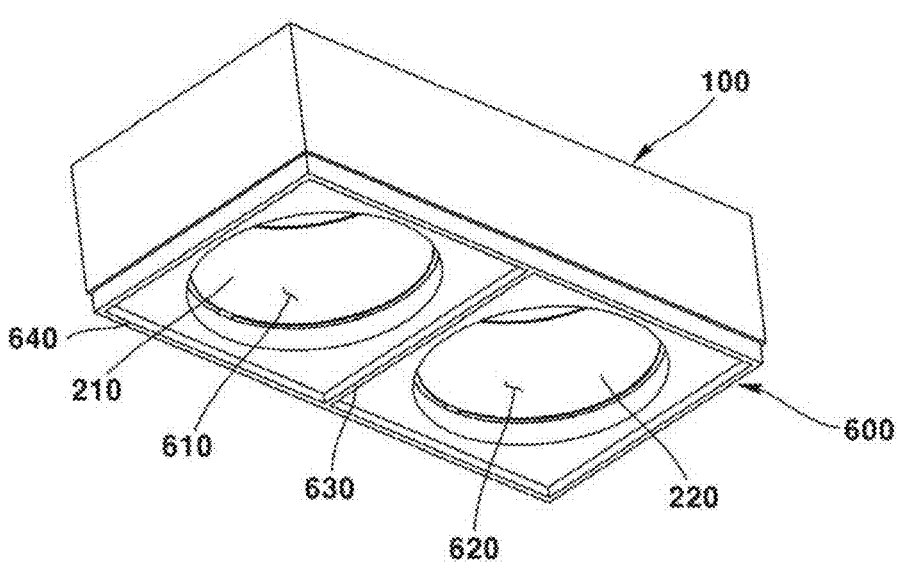
FIG. 10 is a perspective view of bottom surface illustrating a dual camera module according to a first exemplary embodiment of the present invention.

FIG. 1 is a perspective view illustrating a camera module according to a first exemplary embodiment of the present invention, FIG. 2 is an exploded perspective view illustrating a dual camera module according to a first exemplary embodiment of the present invention, FIG. 3 is a plane view illustrating a housing and a first elastic member of a dual camera module apparatus according to a first exemplary embodiment of the present invention, FIG. 4 is a perspective view illustrating a housing and a magnet of a dual camera module according to a first exemplary embodiment of the present invention, FIG. 5 is a perspective view of bottom surface illustrating a housing of a dual camera module according to a first exemplary embodiment of the present invention, FIG. 6 is a perspective view of bottom surface illustrating a housing and a magnet of a dual camera module according to a modification of the present invention, FIG. 7(a) is a plane view illustrating a polarity arrangement of a magnet in a dual camera module according to a first exemplary embodiment of the present invention, and FIG. 7(b) is illustrating a polarity arrangement of a magnet in a dual camera module according to a modification of the present invention, FIG. 8 is a perspective view illustrating a bobbin, a coil and an elastic member of a dual camera module according to a first exemplary embodiment of the present invention, FIG. 9 is a bottom view illustrating a bobbin and an elastic member of a dual camera module according to a first exemplary embodiment of the present invention, and FIG. 10 is a perspective view of bottom surface illustrating a dual camera module according to a first exemplary embodiment of the present invention.

The dual camera module may include a cover member (100), bobbins (210, 220), a housing (300), coils (410, 420), a magnet (500), a base (600) and elastic members (710, 720, 730). However, any one or more of the cover member (100), the bobbins (210, 220), the housing (300), the coils (410, 420), the magnet (500), the base (600) and the elastic members (710, 720, 730) may be omitted or changed from the dual camera module.

The cover member (100) may be accommodated into an inside of the housing (300). The cover member (100) may accommodate, at an inside thereof, bobbins (210, 220), the housing (300), the coils (410, 420), the magnet (500) and the elastic members (710,720, 730) to protect these elements from an external shock. The cover member (100) may be manufactured with a metal material to shield an EMI (Electromagnetic Interference). The cover member (100) may take a bottom-opened cubic shape. However, the present invention is not limited thereto. The cover member (100) may be integrally formed. In this case, the cover member (100) may be advantageous over being manufactured in two separate pieces in terms of manufacturing costs.

The cover member (100) may include an upper plate (101), and a bottom plate (102). The cover member (100) may include an upper plate (101) and a lateral plate (102) extended downwards from a corner of the upper plate (101). The upper plate (101) may be disposed with a first through hole (110) and a second through hole (120). A bottom end of the lateral plate (102) may be coupled by the base (600).

The cover member (100) may include a first through hole (110) and a second through hole (120). The cover member (100) may include a first through hole (110) corresponding to the first bobbin (210) and a second through hole (120) corresponding to the second bobbin (220). The first through hole (110) may be so formed as to correspond to the first bobbin (210). The first through hole (110) may be formed at a position corresponding to that of the first bobbin (210). The first through hole (110) may be so formed as to have a size corresponding to that of the first bobbin (210). The light having passed the first through hole (110) may be introduced into a lens module (not shown) coupled to the first bobbin (210). The second through hole (120) may be so formed as to correspond to the second bobbin (220). The second through hole (120) may be formed at a position corresponding to that of the second bobbin (220). The second through hole (120) may be so formed as to have a size corresponding to that of the second bobbin (220). The light having passed the second through hole (120) may be introduced into a lens module (not shown) coupled to the second bobbin (220).

The bobbin (210, 220) may include a first bobbin (210) and a second bobbin (220). The first bobbin (210) and the second bobbin (220) may independently move by being coupled to each lens module.

The first bobbin (210) and the second bobbin (220) may be disposed on positions mutually different vertical heights. That is, an EFL (Effective Focal Length) of the first bobbin (210) may be different from that of the second bobbin (220). Through this structure, the dual camera according to a first exemplary embodiment of the present invention can implement a digital zooming performance. Meantime, the first and second bobbins (210, 220) may accommodate lenses, each having a different diameter. In this case, the first and second bobbins (210, 220) may have a mutually different diameter.

The first bobbin (210) may be moveably arranged in a first space (301). The first bobbin (210) may be moveably arranged relative to the housing (300) by the first and second elastic members (710, 720) that elastically connect the first bobbin (210) and the housing (300). The first bobbin (210) may be disposed with a first coil (410), and when a power is applied to the first coil (410), the first bobbin (210) may be moved by electromagnetic interaction between the first coil (410) and magnet (500). That is, the first bobbin (210) may move to an optical axis to implement the auto focusing function.

The first bobbin (210) may include a lens receptor (211). The first bobbin (210) may include at an inside an upper-bottom opened lens receptor (211). The lens receptor (211) may be accommodated with the lens module. The lens receptor (211) may be formed with screw threads, for example. In this case, the screw threads of lens receptor (211) may be coupled with those formed at an external circumferential surface of the lens module. However, the present invention is not limited thereto. For example, the lens receptor (211) and the lens module may be coupled and fixed using an adhesive.

The second bobbin (220) may be moveably arranged in a second space (302). The second bobbin (220) may be moveably arranged relative to the housing (300) by the first and third elastic members (710, 730) that elastically connect the second bobbin (220) and the housing (300). The second bobbin (220) may be disposed with a second coil (420), and when a power is applied to the second coil (420), the second bobbin (220) may be moved by electromagnetic interaction between the second coil (420) and magnet (500). That is, the second bobbin (220) may move to an optical axis to implement the auto focusing function.

The second bobbin (220) may include a lens receptor (221). The second bobbin (220) may include at an inside an upper-bottom opened lens receptor (221). The lens receptor (221) may be accommodated with the lens module. The lens receptor (221) may be formed with screw threads, for example. In this case, the screw threads of lens receptor (221) may be coupled with those formed at an external circumferential surface of the lens module. However, the present invention is not limited thereto. For example, the lens receptor (221) and the lens module may be coupled and fixed using an adhesive.

The housing (300) may be formed with an inner space that is divided to a first space (301) and a second space (302) formed by a partition wall (310). The housing (300) may accommodate at an inside a first bobbin (210) and a second bobbin (220). The first space (301) may be disposed with the first bobbin (210). The second space (302) may be disposed with the second bobbin (220). The housing (300) may be formed with a size and a shape corresponding to those of the cover member (100). The housing (300) may be opened at an upper side and a bottom side. However, the present invention is not limited thereto. The housing (300) according to a first exemplary embodiment of the present invention may be called a "yoke" as a member fixing the magnet (500). Meantime, although the first exemplary embodiment of the present invention has explained and illustrated the housing (300) as a fixing member, the housing, as a modification, may be moved or tilted to a direction perpendicular to the optical axis to implement a handshake correction function.

The housing (300) may include a partition wall (310) and a lateral wall (320). The housing (300) may include a lateral wall (320) and a partition wall (310) that connects two opposite lateral walls (320). The housing (300) may include a first magnet receptor (330), a second magnet receptor (340) and a third magnet receptor (350). The housing (300) may include a first magnet receptor (330) disposed on a bottom side of the partition wall (310) to accommodate a first magnet (510). The housing (300) may include a second magnet receptor (340) formed on the lateral wall (320) in an inside/outside opened shape to accommodate a second magnet (520) facing the first coil (410). The housing (300) may include a third magnet receptor (350) formed on the lateral wall (320) in an inside/outside opened shape to accommodate a third magnet (530) facing the second coil (420). The housing (300) may include a spacer (360) protrusively formed from an upper surface of the lateral wall (320) to an upper side.

The partition wall (310) may be formed at a partial area between the first space (301) and the second space (302), which is an inner space of the housing (300). The height of the partition wall (310) may be lower than that of the housing (300). The partition wall (310) may be disposed on an upper surface of the housing (300) and the first magnet receptor (330) may be disposed on a bottom surface of the housing (300). That is, the partition wall (310) may be disposed above the first magnet receptor (330). At this time, the first magnet receptor (330) may be a bottom side-opened groove, and the first magnet (510) may be insertedly disposed on a bottom side of the first magnet receptor (330). Alternatively, the partition wall may be disposed on a bottom surface of the housing (300), and the first magnet receptor (330) may be disposed on an upper surface of the housing (300). That is, the partition wall (310) may be disposed on a bottom side of the first magnet receptor (330). At this time, the first magnet receptor (330) may be an upper side-opened groove, and the first magnet (510) may be insertedly disposed above the first magnet receptor (330). Alternatively the first magnet receptor (330) may be formed as a through hole on the partition wall (310). At this time, the first magnet (510) may be inserted and disposed on a lateral side of the first magnet receptor (330).

The partition wall (310) may connect two lateral walls, each lateral wall facing the other lateral wall. The partition wall (310) may divide an inner space of the housing (300) to a first space (301) and a second space (302). The partition wall (310) may divide the first space (301) and the second space (302) in an equal size, and may also divide the first space (301) and the second space (302) in a different size. The partition wall (310) may be integrally formed with the lateral wall (320) of housing (300). The housing (300) may be omitted with the partition wall (310) and may be instead formed with a through hole. In this case, the first magnet (510) may be disposed on the through hole to divide the first space (301) and the second space (302). That is, the partition wall (310) may be omitted to allow the first magnet (510) to function as a partition wall (310). In this case, a height of the first magnet (510) may correspond to that of the housing (300).

The lateral wall (320) may form an exterior look of the housing (300). The lateral wall (320) may be so formed as to correspond to the cover member (100). The lateral wall (320) may be formed in a shape and a size that correspond to those of the cover member (100). The lateral wall (320) may be formed in 4 pieces, for example, and facing two lateral walls (320) may be symmetrically formed. The two adjacent lateral walls (320) among the 4 lateral walls (320) may have a different size, where the size of larger lateral wall (320) may be double the size of the smaller lateral wall (320). However, the present invention is not limited thereto.

The first magnet receptor (330) can accommodate the first magnet (510). The first magnet receptor (330) may be a bottom-opened groove, through which the first magnet (510) can be assembled to a bottom side of the first magnet receptor (330) in the manufacturing process. The first magnet receptor (330) may be disposed on a bottom side of the partition wall (310). At least one portion of the first magnet receptor (330) may be formed with a groove corresponding to the first magnet (510) in terms of shape, to thereby support the first magnet (510) lest the first magnet (510) be disengaged. The first magnet receptor (330) and the first magnet (510) may be coupled by an adhesive. In a modification, the first magnet receptor (330) may be an upper-bottom opened through hole. That is, the partition wall (310) may be omitted. In this case, the first magnet (510) may be slid and inserted into the first magnet receptor (330) from an upper side or a bottom side. At this time, the housing (300) may be formed with a structure fixing the first magnet (510).

The second magnet receptor (340) may accommodate the second magnet (520). The second magnet receptor (340) may be of a bottom-opened type as illustrated in FIG. 6. In this case, the second magnet (520) can be assembled from a bottom side to the second magnet receptor (340) in the manufacturing process. At least one portion of the second magnet receptor (340) may be formed with a groove corresponding to the second magnet (520) in terms of shape, to thereby support the second magnet (520) lest the second magnet (520) be disengaged. The second magnet receptor (340) and the second magnet (520) may be coupled by an adhesive.

The third magnet receptor (350) may accommodate the third magnet (530). The third magnet receptor (350) may be of an inside/outside-opened type as illustrated in FIG. 5. In this case, the third magnet (530) can be assembled from a lateral side to the third magnet receptor (350) in the manufacturing process. The third magnet receptor (350) may be of a bottom-opened type as a modification as illustrated in FIG. 6. In this case, the third magnet (530) may be assembled from a bottom side to the third magnet receptor (350) in the manufacturing process.

At least one portion of the third magnet receptor (350) may be formed with a groove corresponding to the third magnet (530) in terms of shape, to thereby support the third magnet (530) lest the third magnet (530) be disengaged. The third magnet receptor (350) and the third magnet (530) may be coupled by an adhesive.

The spacer (360) may be protrusively and upwardly formed from an upper surface of the lateral wall (320) at the housing (300). The spacer (360) may be so formed as to secure an upper moving space of the bobbin (210, 220) coupled to the first elastic member (710). That is, the spacer (360) can separate an upper surface of the lateral wall (320) at the housing (300) from an inner surface of upper plate (101) at the cover member (100). That is, a discrete space between the upper surface of the lateral wall (320) at the housing (300) and the inner surface of the upper plate (101) at the cover member (100) may be used as a movable space of the first elastic member (710) and the bobbin (210, 220).

The coil (410, 420) may include a first coil (410) and a second coil (420). The coil (410, 420) may take a shape wound on an external circumferential surface of the bobbin (210, 220), for example. Furthermore, the coil (410, 420) may be disposed on an external circumferential surface of the bobbin (210, 220) in a coil block shape, as a modification. The first coil (410) and the second coil (420) may receive a separate power.

The first coil (410) may be disposed on the first bobbin (210). The first coil (410) may be disposed on an external circumferential surface of the first bobbin (210). The first coil (410) may face the first magnet (510) and the second magnet (520), through which, when a power is applied to the first coil (410), the first coil (410) may be moved by electromagnetic interaction between the first coil (410) and the first and second magnets (510, 520). At this time, the first bobbin (210) may also move along with the first coil (410). The first coil (410) may receive a power through the second elastic member (720). However, the present invention is not limited thereto, and the first coil (410) may also receive the power from the first elastic member (710). In this case, the first elastic member (710) may be formed by being separated to more than two pieces.

The first coil (420) may be disposed on the second bobbin (220). The second coil (420) may be disposed on an external circumferential surface of the second bobbin (220). The second coil (420) may face the first magnet (510) and the third magnet (530), through which, when a power is applied to the second coil (420), the second coil (420) may be moved by electromagnetic interaction between the second coil (420) and the first and third magnets (510, 530). At this time, the second bobbin (220) may also move along with the second coil (420). The second coil (420) may receive a power through the third elastic member (730). However, the present invention is not limited thereto, and the second coil (420) may also receive the power from the second elastic member (720). In this case, the second elastic member (720) may be formed by being separated to more than two pieces.

The magnet (500) may be disposed on the housing (300). However, the magnet (500) may be also disposed on the bobbin (210, 220) and the coil (410, 420) may be also disposed on the housing (300). The magnet (500) may move the coil (410, 420) through electromagnetic interaction with the coil (410, 420). However, when the coil (410, 420) is disposed on the housing (300) and the magnet (500) is disposed on the bobbin (210, 220), the magnet (500) can be moved. The magnet (500) may be a flat magnet. However, the present invention is not limited thereto.

The first magnet (510) may be disposed on the first magnet receptor (330). The first magnet (510) may be disposed on a bottom side of the partition wall (310). The first magnet (510) may be coupled to a bottom side of the first magnet receptor (330). As a modification, the partition wall (310) may be omitted from the housing (300), and the first magnet (510) may be disposed with a size corresponding to a height of the housing (300). The first magnet (510) may commonly interact to the first coil (410) and the second coil (420). That is, the first magnet (510) may face both the first coil (410) and the second coil (420). The first magnet (510) may take a flat rectangular shape. However, the present invention is not limited thereto. The first magnet (510) may be formed to be thicker than the second magnet (520) and the third magnet (530).

The first magnet (510) may be integrally formed. As a modification, the first magnet (510) may be formed with a magnet separated to 2 (two) pieces. A shield plate (not shown) may be disposed between the two separated magnets. The shield plate can remove a phenomenon where the electromagnetic interaction with the first coil (410) and the electromagnetic interaction with the second coil mutually affect. That is, the shield plate may be disposed between the first space (301) and the second space (302) to remove the phenomenon where the electromagnetic force of the first space (301) affects the second space (302) or the electromagnetic force of the second space (302) affects the first space (301). The shield plate may take a flap shape. However, the present invention is not limited thereto, any shape capable of shielding the electromagnetic force will be sufficient. The shield plate may be a shield sheet or a shield metal plate. The shield plate may be formed with a metal. However, the present invention is not limited thereto. The shield plate may be coupled to at least one piece of magnet that is separated to two pieces. At this time, the shield plate and the magnet may be coupled by bonding.

The second magnet (520) may be disposed on the second magnet receptor (340). The second magnet (520) may be disposed on the lateral wall (320) of the housing (300). The second magnet (520) may be coupled at a lateral side of the second magnet receptor (340), for example. The second magnet (520) may be coupled to a bottom side of the second magnet receptor (340) as a modification. The second magnet (520) may take a flat rectangular shape. The second magnet (520) may be formed in three pieces, for example, but the present invention is not limited thereto.

The third magnet (530) may be disposed on the third magnet receptor (350). The third magnet (530) may be disposed on the lateral wall (320) of the housing (300). The third magnet (530) may be coupled at a lateral side of the third magnet receptor (350), for example. The third magnet (530) may be coupled to a bottom side of the third magnet receptor (350) as a modification. The third magnet (530) may take a flat rectangular shape. The third magnet (530) may be formed in three pieces, for example, but the present invention is not limited thereto.

An inner surface of the second magnet (520) and an inner surface of the third magnet (530) may have a mutually different polarity, as illustrated in FIG. 7(*a*) and FIG. 7(*b*). For example, the inner surface of the second magnet (520) may have an N pole while the inner surface of the third magnet (530) may have an S pole. At this time, a lateral surface at a second magnet (520) side of the first magnet (510) may have an N pole, while a lateral surface at a third magnet (530) side of the first magnet (510) may have an S pole. Conversely, an inner surface of the second magnet (520) may have an S pole while an inner surface of the third magnet (530) may have an N pole. At this time, a lateral surface at a second magnet (520) side of the first magnet (510) may have an S pole, while a lateral surface at a third magnet (530) side of the first magnet (510) may have an N pole. In a modification, when the first magnet (510) is formed with two magnets by being separated, both the first space (301) side and the second space (302) side may be arranged with N poles at each inner side thereof. Alternatively, both the first space (301) side and the second space (302) side may be arranged with S poles at each inner side thereof.

The magnet (500) may be disposed with one first magnet (510), three second magnets (520) and three third magnet (530), as illustrated in FIG. 7(*a*). Alternatively, the magnet (500) may be arranged, as a modification, with one first magnet (510), one second magnet (520) and one third magnet (530) as illustrated in FIG. 7(*b*). However, the present invention is not limited thereto.

The base (600) may support the housing (300) at a bottom side. The base ≙ (300) may be coupled to a bottom end of the lateral plate (102) of the cover member (100). An inner space formed by coupling between the base (300) and the cover member (100) may be disposed with such elements as the bobbin (210, 220) and the housing (300) and the like.

The base (600) may be disposed on a bottom side with a PCB (Printed Circuit Board). An upper surface of the PCB disposed on a bottom side of the (600) may be mounted with an image sensor (not shown). At this time, the number of image sensors may be 2 pieces, which is the same as the number of bobbin (210, 220), through which a light introduced through a lens module respectively coupled to the first bobbin (210) and the second bobbin (220) can be obtained by each image sensor. In this case, an image sensor at a first bobbin (210) side may be called a first image sensor (not shown), and an image sensor at a second bobbin (220) side may be called a second image sensor (not shown).

The base (600) may include a separation wall (630) interposed between the first image sensor and the second image sensor so that a light introduced through the lens module coupled to the first bobbin (210) can be reached only to the first image sensor while the light is not allowed to reach the second image sensor. That is, the base (600) may include the separation wall (630) disposed between the first image sensor and the second image sensor so that a light introduced through the lens module coupled to the second bobbin (220) can reach only the second image sensor while the light is not allowed to reach the first image sensor.

The base (600) may include a first opening (610) corresponding to the first bobbin (210) and a second opening (620) corresponding to the second bobbin (220). The first opening (610) may be formed to face the first bobbin (210). The first opening (610) may be formed at a position corresponding to that of the first bobbin (210). The first opening (610) may be formed with a size corresponding to that of the first bobbin (210), through which a light introduced through the lens module coupled to the first bobbin (210) can reach the first image sensor, and the light introduced through the lens module coupled to the second bobbin (220) can reach the second image sensor.

The base (600) may be arranged at a bottom surface with a separation wall (630) interposed between the first opening (610) and the second opening (620) and protrusively formed toward a bottom side. The separation wall (630) may be extended from a corner of one side of the bottom surface at the base (600) to a corner of the other side at the base (600). Through this configuration, a light having passed the lens module coupled to the first bobbin (210) and a light having passed the lens module coupled to the second bobbin (220) may be inhibited from being mutually interfered or affecting the image sensor at the other side.

A lug (640) may be protrusively formed with a same height as that of the separation wall (630) by circumventing an external circumferential surface at the bottom surface of the base (600). A bottom surface of the lug (640) and the PCB may be coupled by being directly contacted thereto. However, a separate member may be interposed between the base (600) and the PCB.

The elastic member (710, 720, 730) may elastically couple the bobbin (210, 220) with the housing (300). The elastic member (710, 720, 730) may movably support the bobbin (210, 220) relative to the housing (300). The elastic member (710, 720, 730) may be a leaf spring, for example, but there is no limitation thereto.

The first elastic member (710) may be integrally formed. When the first elastic member (710) coupled to both the first bobbin (210) and the second bobbin (220) is integrally manufactured as illustrated in the first exemplary embodiment of the present invention, the first elastic member (710) can be manufactured with one etching form, which is advantageous in terms of manufacturing cost. However, in order to add an auto focusing feedback function to a dual camera module according the first exemplary embodiment of the present invention, many more conductive lines are required, such that the first elastic member (710) may be separably disposed to allow being used as conductive lines.

The first elastic member (710) may be coupled to the second bobbin (220) and the housing (300). The first elastic member (710) may be coupled to an upper surface of first bobbin (210), an upper surface of second bobbin (220) and an upper surface of housing (300). The first bobbin (210) and the second bobbin (220) coupled to the first elastic member (710) may independently move therebetween.

The first elastic member (710) may include an external portion (711), a first internal portion (712), a first connection portion (713), a second internal portion (714) and a second portion (715). The first elastic member (710) may include an external portion (711) coupled to an upper surface of the housing (300), a first internal portion (712) coupled to an upper surface of first bobbin (210), a first connection portion (713) connecting the external portion (711) and the first internal portion (712), a second internal portion (714) coupled to an upper surface of second bobbin (220) and a second connection portion (715) connecting the external portion (711) and the second internal portion (714).

The second elastic member (720) may be coupled to the first bobbin (210) and the housing (300). The second elastic member (720) may be coupled to a bottom surface of first bobbin (210) and to a bottom surface of the housing (300). The second elastic member (720) may be divided to a pair to be electrically connected to the first coil (410). The second elastic member (720) may include a first conductive portion (720*a*) and a second conductive portion (720*b*), each arranged in a symmetrical formation from the other. The second elastic member (720) may provide a power to the first coil (410) by being electrically connected to an outside power source and providing the supplied power to the first coil (410). The second elastic member (720) may include an external portion (721), an internal portion (722) and a connection portion (723). The second elastic member (720) may include an external portion (721) coupled to a bottom surface of housing (300), an internal portion (722) coupled to a bottom surface of the first bobbin (210), and a connection portion (723) connecting the external portion (721) and the internal portion (722).

The third elastic member (730) may be coupled to the second bobbin (220) and the housing (300). The third elastic member (730) may be coupled to a bottom surface of second bobbin (220) and to a bottom surface of the housing (300). The third elastic member (730) may be divided to a pair to be electrically connected to the second coil (420). The third elastic member (730) may include a third conductive portion (730*a*) and a fourth conductive portion (730*b*), each arranged in a symmetrical formation from the other. The third elastic member (730) may provide a power to the second coil (420) by being electrically connected to an outside power source and providing the supplied power to the second coil (420). The third elastic member (730) may include an external portion (731), an internal portion (732) and a connection portion (733). The third elastic member (730) may include an external portion (731) coupled to a bottom surface of housing (300), an internal portion (732) coupled to a bottom surface of the second bobbin (220), and a connection portion (733) connecting the external portion (731) and the internal portion (732).

Hereinafter, operation of dual camera module according to a first exemplary embodiment will be described.

When the first coil (410) coupled to the first bobbin (210) of dual camera module according to the first exemplary embodiment of the present invention is provided a power through the second elastic member (720), the first bobbin (210) may move to an optical axis direction to perform an auto focusing function. Furthermore, when a power5 is supplied to the second coil (420) coupled to the second bobbin (220) through the third elastic member (730), the second bobbin (220) may move to an optical axis direction to perform an auto focusing function. That is, the first bobbin (210) and the second bobbin (220) may be independently driven.

The dual camera module according to a first exemplary embodiment of the present invention may include a first bobbin (210) and a second bobbin (220). The first bobbin (210) and the second bobbin (220) may be coupled with a lens module respectively. At this time, the first bobbin (210) may provide a narrow view angle over the second bobbin (220), and the second bobbin (220) may provide a broader view angle than the first bobbin (210). That is, the lens module of first bobbin (210) may function as a telephoto lens, while the lens module of second bobbin (220) may function as a wide-angle lens.

A lens module of first bobbin (210) at the dual camera module according to a first exemplary embodiment of the present invention and a lens module of second bobbin (220) can provide a digital zooming function while optical axes are realized of being aligned. The dual camera module according to the first exemplary embodiment of the present invention may output an image obtained through the lens module of second bobbin (220) when a user photographs an object of proximate distance, and output an image obtained through the lens module of first bobbin (210) when a user photographs an object of long distance. Furthermore, the dual camera module according to the first exemplary embodiment of the present invention may output an image by combining an image obtained by the lens module of first bobbin (210) based on a distance to an object and an image obtained by the lens module of second bobbin (220). That is, the dual camera module according to the first exemplary embodiment of the present invention can obtain subjects both in near distances and long distances by clear quality of images.

Hereinafter, configuration of optical device according to a second exemplary embodiment of the present invention will be described.

The optical device may be a hand phone, a mobile phone, a smart phone, a portable smart device, a digital camera, a notebook computer (laptop computer), a PMP (Portable Multimedia Player) and a navigation device. However, the present invention is not limited thereto, and any device may be called an optical device capable of photographing an image or a photograph.

The optical device may include a main body (not shown), a display portion (not shown) disposed on the main body to display information, and a camera (not shown) disposed on the main body to photograph an image of a photograph, and having a camera module (not shown).

Now, hereinafter, configuration of camera module according to a second exemplary embodiment of the present invention will be described.

The camera module may include a lens driving apparatus (1000), a lens module (not shown), an IR (Infrared cut-off filter (not shown), a PCB (Printed Circuit Board, not shown), an image sensor (not shown) and a controller (not shown). However, any one or more of the lens driving apparatus (1000), the lens module (not shown), the IR cut-off filter, the PCB, the image sensor and the controller may be omitted or changed.

The lens module may include one or more lenses (not shown) and a lens barrel accommodating one or more lenses. However, one element of the lens module is not limited by the lens barrel, and any holder structure capable of supporting one or more lenses will suffice. The lens module may move along with the lens driving apparatus (1000) by being coupled to the lens driving apparatus (1000). The lens module may be coupled to an inside of the lens driving apparatus (1000), for example. The lens module may be screw-coupled with a lens driving apparatus (1000), for example. The lens module may be coupled to the lens driving apparatus (1000) using an adhesive, for example. Meantime, a light having passed the lens module may be irradiated on an image sensor.

The infrared cut-off filter may serve to inhibit a light of infrared ray region from entering an image sensor. The infrared cut-off filter may be interposed between the lens module and the image sensor, for example. The infrared cut-off filter may be disposed on a holder member (not shown) separately disposed from a base (1600). However, the infrared cut-off filter may be installed at a hollow hole (1611) formed at a center of a base (1600). The infrared cut-off filter may be formed with a film material or a glass material, for example. Meantime, the infrared cut-off filter may be formed by allowing an infrared cut-off coating material to be coated on a plate-shaped optical filter such as an imaging plane protection cover glass or a cover glass, for example.

A PCB (Printed Circuit Board) may support the lens driving apparatus (1600). The PCB may be mounted with an image sensor. For example, an upper inner side of the PCB may be disposed with an image sensor, and an upper outside of the PCB may be disposed with a sensor holder (not shown). An upper side of the sensor holder may be disposed with the lens driving apparatus (1000). Alternatively, an upper outside of the PCB may be disposed with the lens driving apparatus (1000), and an upper inner side of the PCB may be disposed with an image sensor. Through this structure, a light having passed the lens module accommodated inside the lens driving apparatus (1000) may be irradiated onto the image sensor mounted on the PCB. The PCB may supply a power to the lens driving apparatus (1000). Meantime, the PCB may be disposed with a controller in order to control the lens driving apparatus (1000).

The image sensor may be mounted on the PCB. The image sensor may be so disposed as to match the lens module in terms of optical axis, through which the image sensor can obtain a light having passed the lens module. The image sensor may output the irradiated light as an image. The image sensor may be a CCD (charge coupled device), an MOS (metal oxide semi-conductor), a CPD and a CID, for example. However, the types of image sensor are not limited thereto.

The controller may be mounted on a PCB. The controller may be disposed on an outside of the lens driving apparatus (1000). However, the controller may be also disposed on an inside of the lens driving apparatus (1000). The controller may control a direction, intensity and an amplitude of a current supplied to each element of lens driving apparatus (1000). The controller may perform any one of an AF function and an OIS function of the camera module by controlling the lens driving apparatus (1000). That is, the controller may move the lens module to an optical axis direction or tile the lens module to a direction orthogonal to the optical axis direction by controlling the lens driving apparatus (1000). Furthermore, the controller may perform a feedback control of AF function and OIS function.

Hereinafter, configuration of lens driving apparatus (1000) according to a second exemplary embodiment of the present invention will be described in detail with reference to the accompanying drawings.

Figure 11:
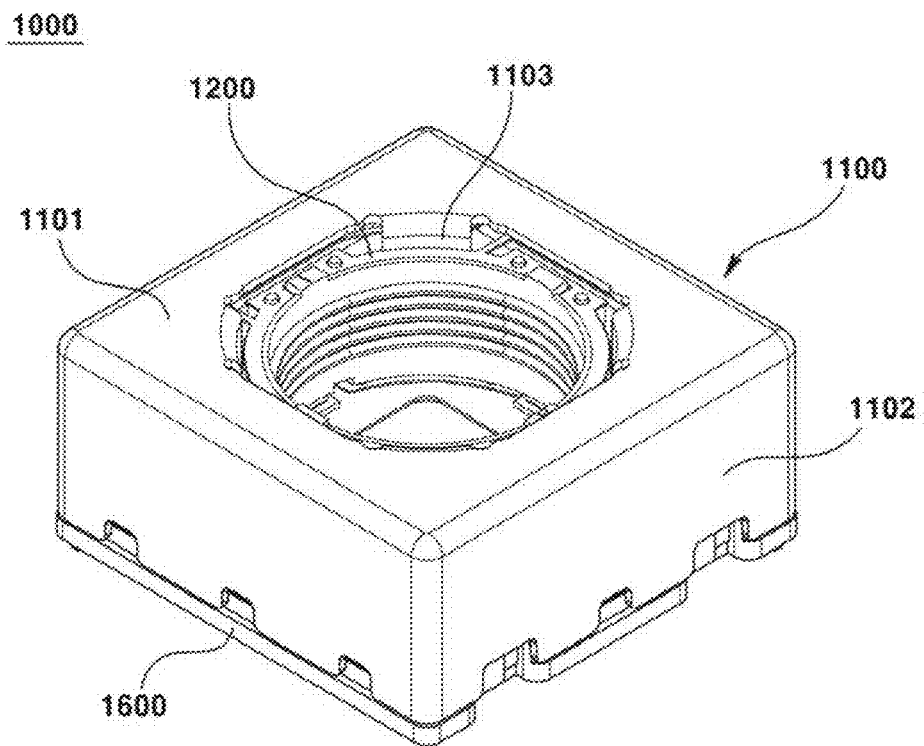
FIG. 11 is a perspective view illustrating a lens driving device according to a second exemplary embodiment of the present invention.
Figure 12:
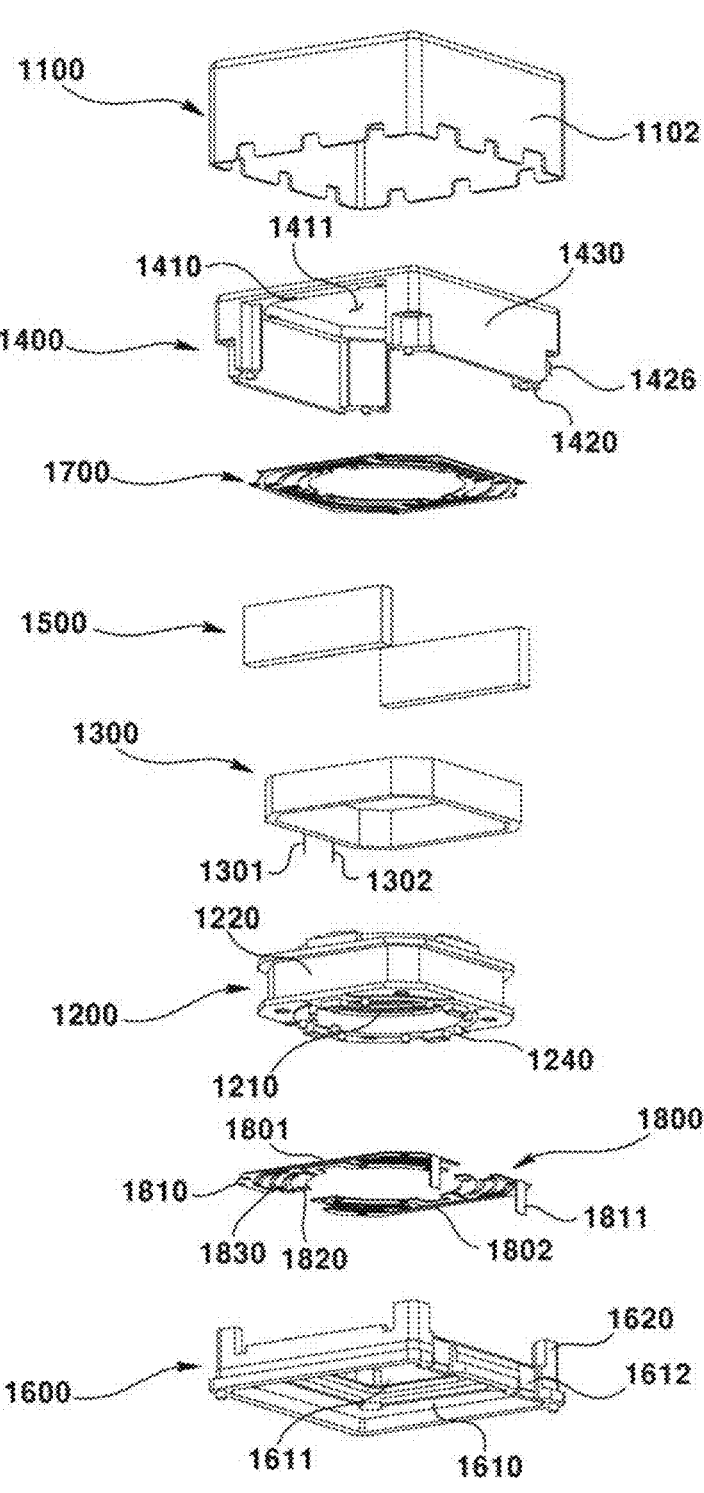
FIG. 12 is an exploded perspective view illustrating a lens driving device according to a second exemplary embodiment of the present invention.
Figure 13:
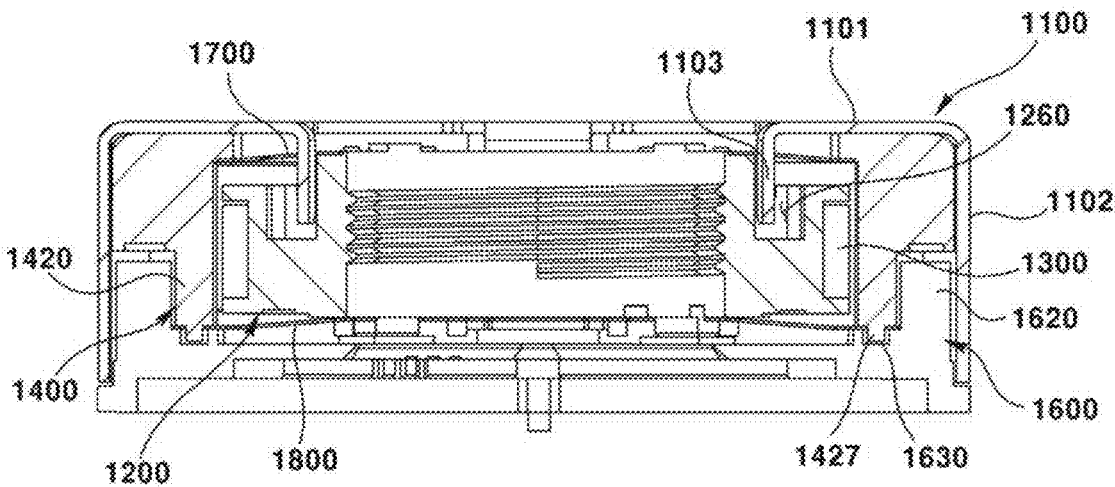
FIG. 13 is a cross-sectional view illustrating a lens driving device according to a second exemplary embodiment of the present invention.
Figure 14:
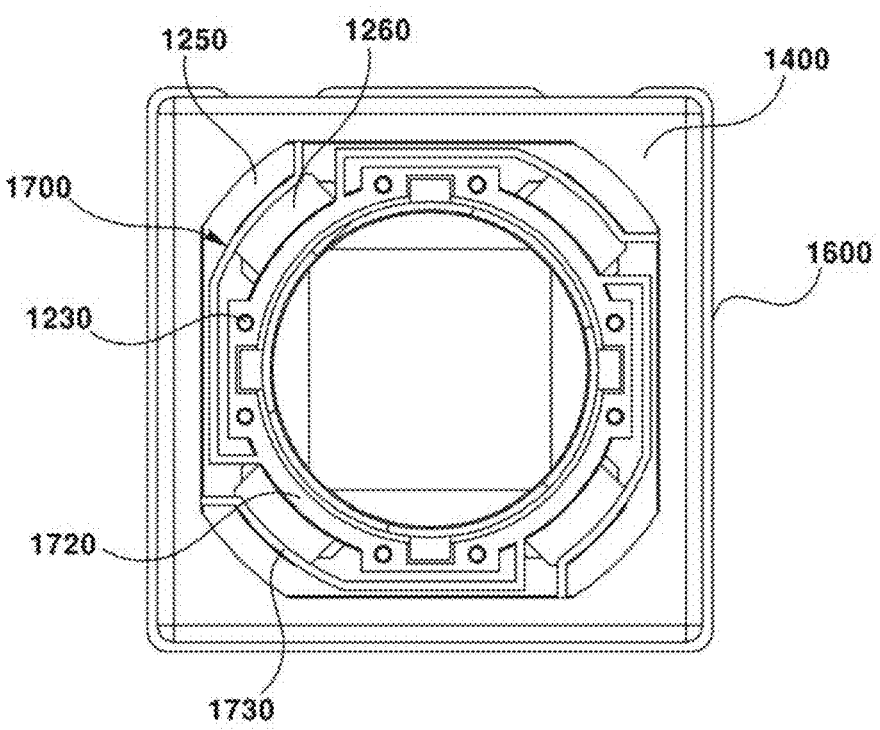
FIG. 14 is a plane view illustrating some elements of lens driving device according to a second exemplary embodiment of the present invention.
Figure 15:
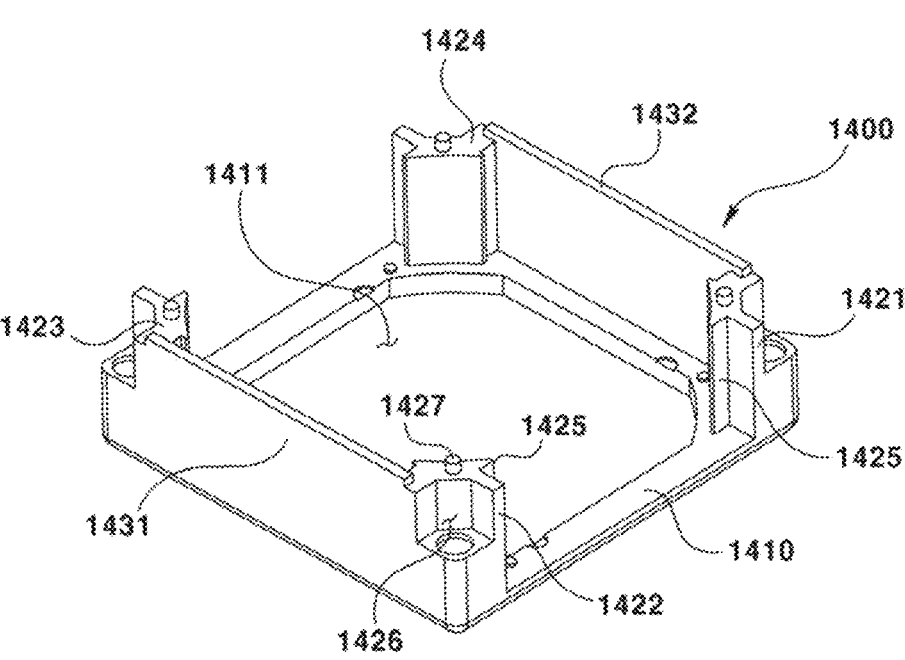
FIG. 15 is a perspective view of bottom surface illustrating a housing of a lens driving device according to a second exemplary embodiment of the present invention.
Figure 16:
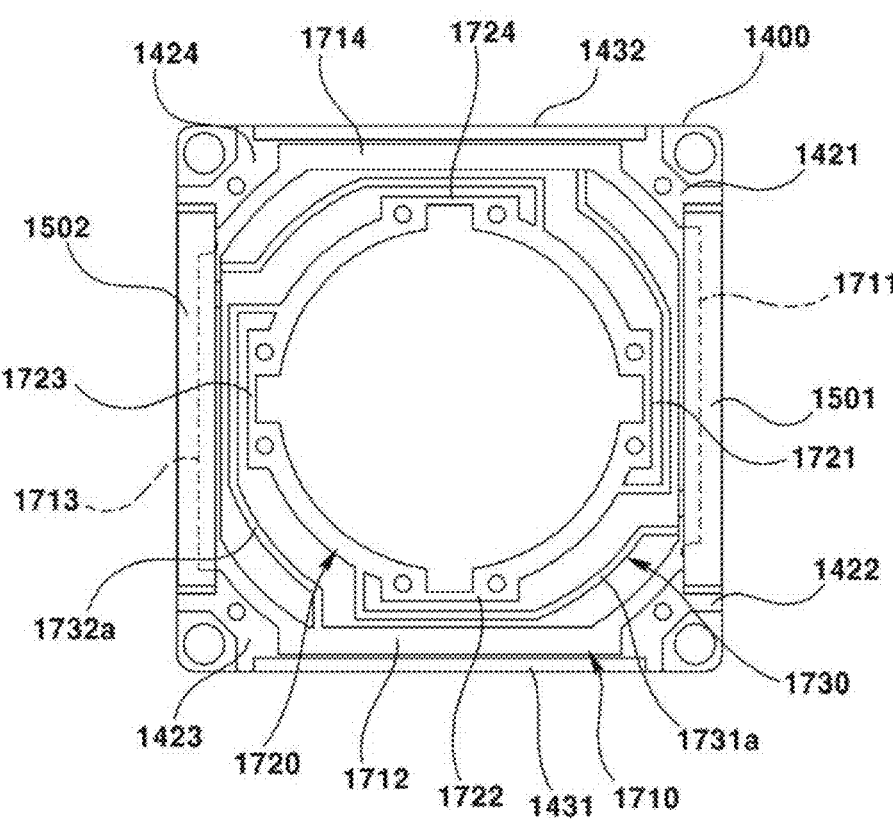
FIG. 16 is a bottom view illustrating some elements of a lens driving device according to a second exemplary embodiment of the present invention.
Figure 17:
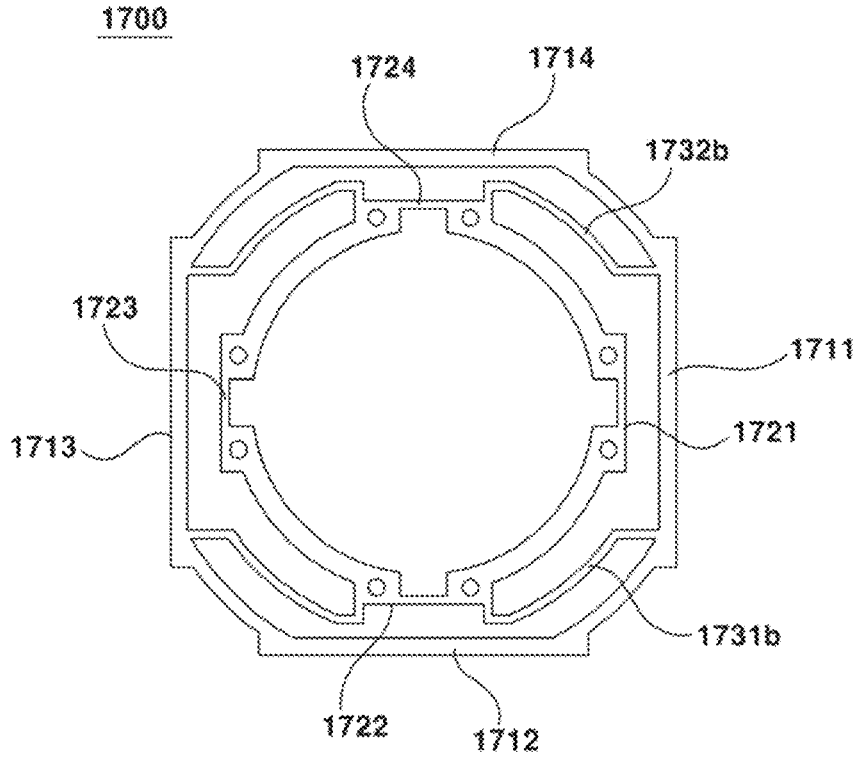
FIG. 17 is a plane view illustrating an upper support member according to a modification of the present invention.
Figure 18:
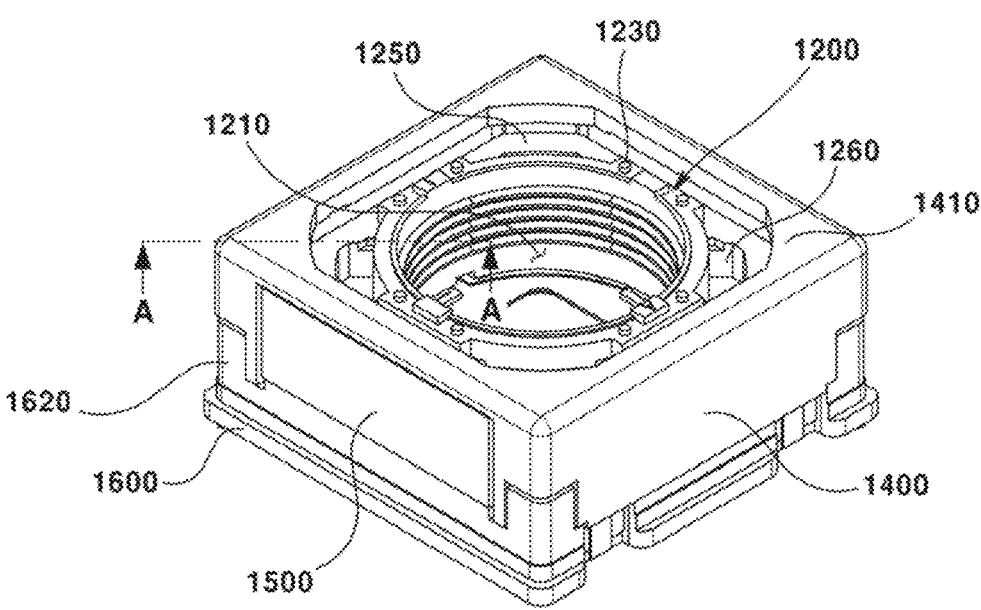
FIG. 18 is a perspective view illustrating some elements of a lens driving device according to a second exemplary embodiment of the present invention.
Figure 19:
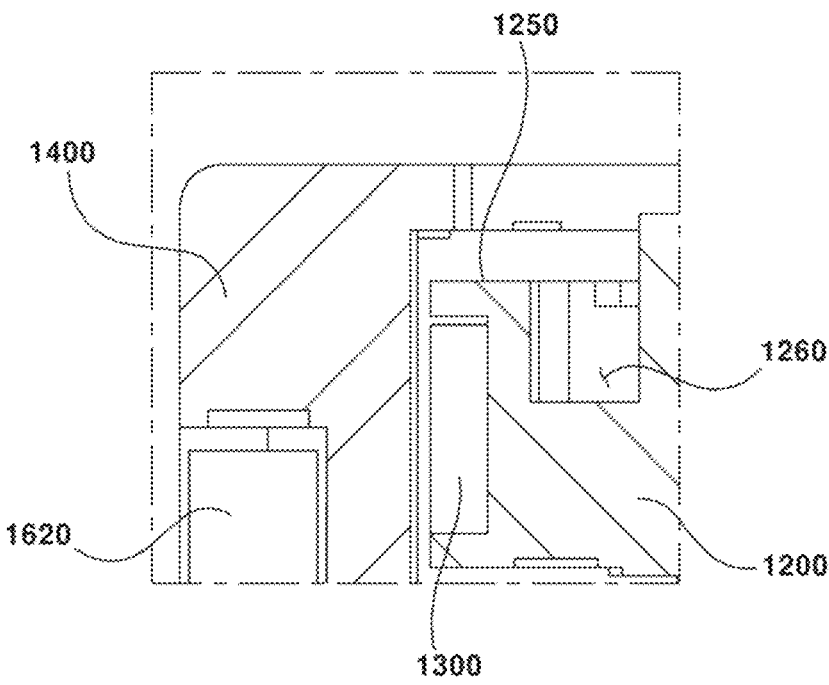
FIG. 19 is a cross-sectional view taken along line A1-A2 of FIG. 18.
Figure 20:
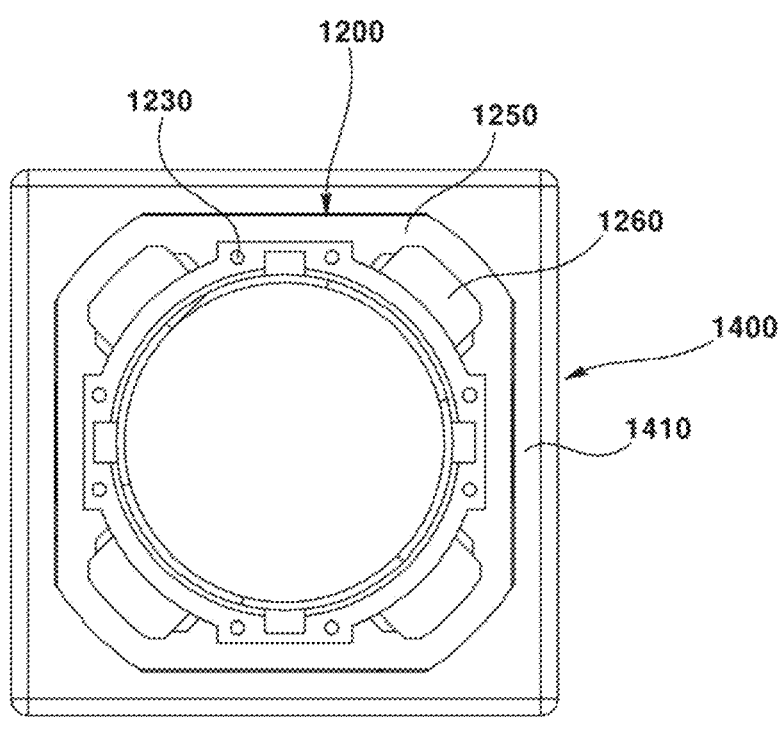
FIG. 20 is a plane view illustrating some elements of a lens driving device according to a second exemplary embodiment of the present invention.
Figure 21:
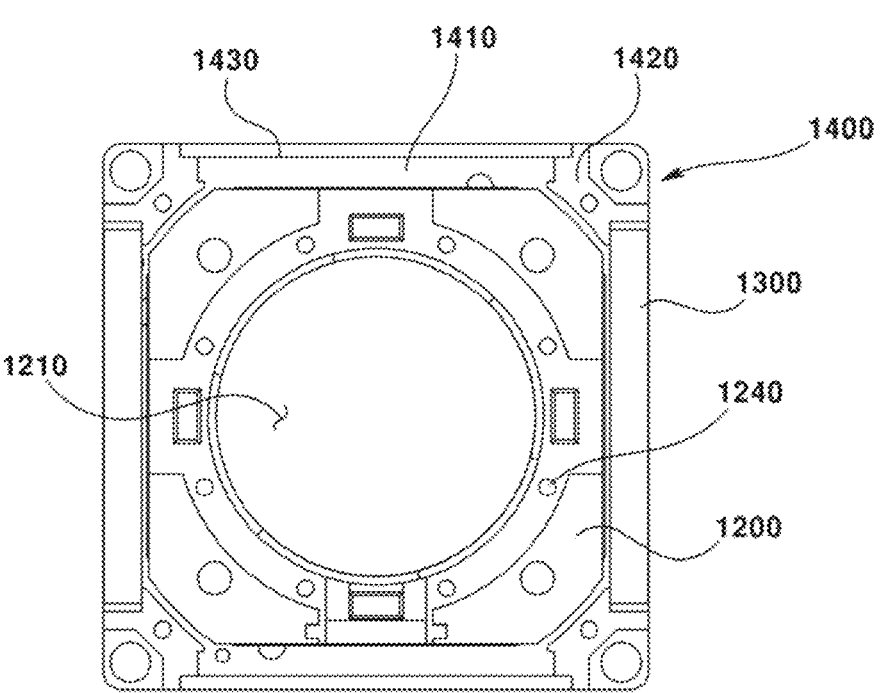
FIG. 21 is a bottom view illustrating some elements of a lens driving device according to a second exemplary embodiment of the present invention.
Figure 22:
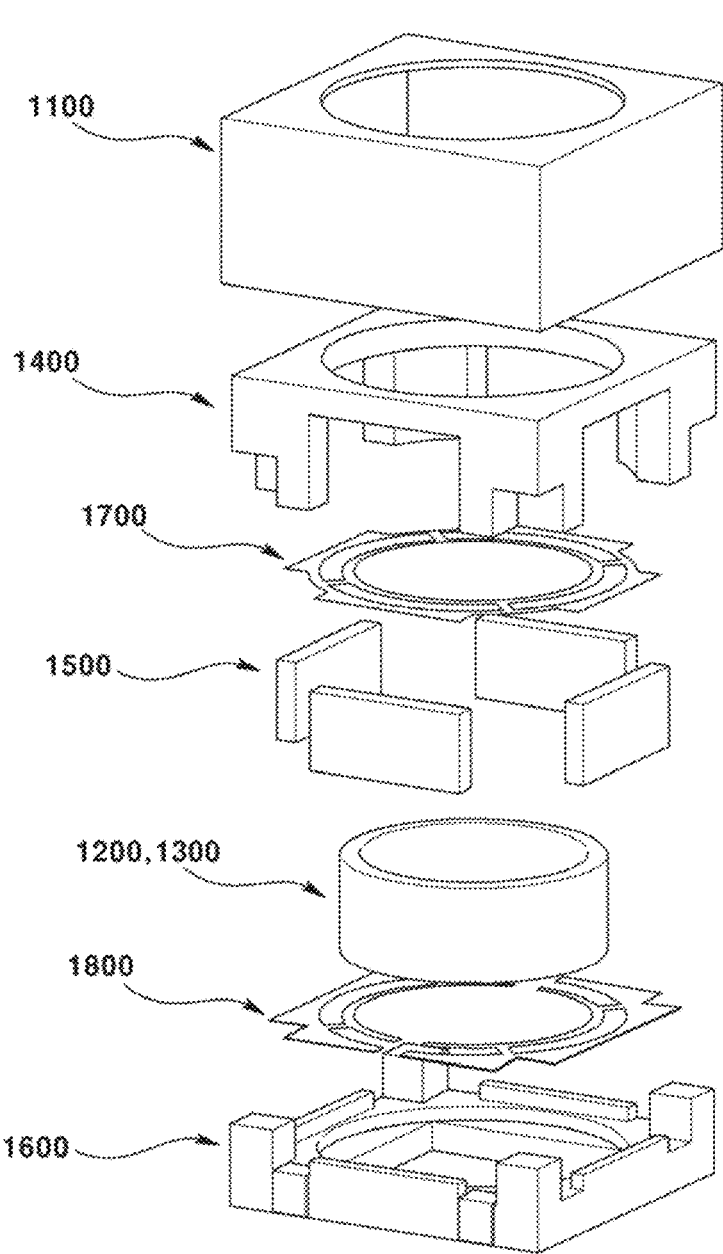
FIG. 22 is an exploded perspective view illustrating a lens driving device according to a modification of the present invention.
Figures 23A, 23B, 23C:
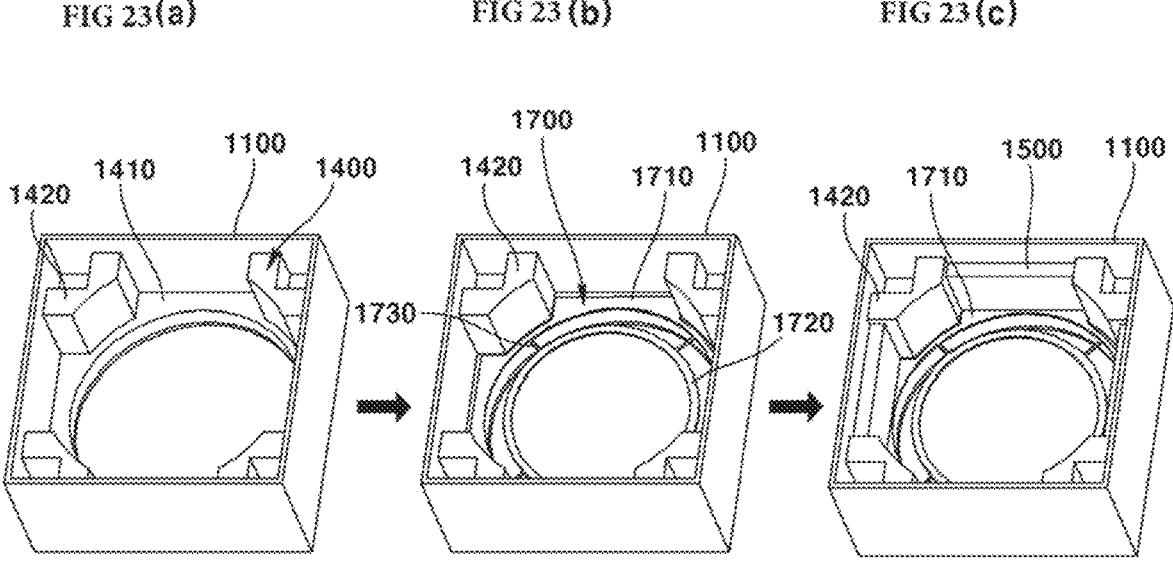
FIG. 23(a)-FIG. 23(c) show perspective views of a bottom surface illustrating steps of an assembly process of upper support member and a second driving portion of a lens driving device according to a modification of the present invention.

FIG. 11 is a perspective view illustrating a lens driving device according to a second exemplary embodiment of the present invention, FIG. 12 is an exploded perspective view illustrating a lens driving device according to a second exemplary embodiment of the present invention, FIG. 13 is a cross-sectional view illustrating a lens driving device according to a second exemplary embodiment of the present invention, FIG. 14 is a plane view illustrating some elements of lens driving device according to a second exemplary embodiment of the present invention, FIG. 15 is a perspective view of bottom surface illustrating a housing of a lens driving device according to a second exemplary embodiment of the present invention, FIG. 16 is a bottom view illustrating some elements of a lens driving device according to a second exemplary embodiment of the present invention, FIG. 17 is a plane view illustrating an upper support member according to a modification of the present invention, FIG. 18 is a perspective view illustrating some elements of a lens driving device according to a second exemplary embodiment of the present invention, FIG. 19 is a cross-sectional view taken along line A1-A2 of FIG. 18, FIG. 20 is a plane view illustrating some elements of a lens driving device according to a second exemplary embodiment of the present invention, FIG. 21 is a bottom view illustrating some elements of a lens driving device according to a second exemplary embodiment of the present invention, FIG. 22 is an exploded perspective view illustrating a lens driving device according to a modification of the present invention, and FIG. 23(a)-23(c) are perspective views of bottom surface illustrating an assembly process of upper support member and a second driving portion of a lens driving device according to a modification of the present invention.

The lens driving apparatus (1000) may include a cover member (1100), a bobbin (1200), a first driving portion (1300), a housing (1400), a second driving portion (1500), a base (1600) and a support member (1700, 1800). However, any one or more of the cover member (1100), the bobbin (1200), the first driving portion (1300), the housing (1400), the second driving portion (1500), the base (1600) and the support member (1700, 1800) may be omitted from the lens driving apparatus (1000).

The lens driving apparatus (1000) according to the second exemplary embodiment of the present invention may be applied to the dual camera module according to the first exemplary embodiment of the present invention. To be more specific, two lens driving apparatuses (1000) according to the second exemplary embodiment of the present invention may be applied to the dual camera module. At this time, as explained in the first exemplary embodiment, two housings (1400), two bases (1600) and two cover members (1100) may be integrally formed in the two lens driving apparatuses (1000) according to the second exemplary embodiment. However, two lens driving apparatuses (1000) may be separately disposed in parallel, each distanced from the other. At this time, a shield plate configured to shield the electromagnetic force may be interposed between two lens driving apparatuses (1000).

The cover member (1100) may form an exterior look of lens driving apparatus (1000). The cover member (1100) may take a bottom-opened cubic shape. However, the shape of the cover member (1100) of the present invention is not limited thereto. An inner space formed by the cover member (1100) and the base (1600) may be disposed with a bobbin (1200), a first driving portion (1300), a housing (1400), a second driving portion (1500), and a support member (1700, 1800). Through this configuration, the cover member (1100) can protect the inner elements against the external shocks and inhibit intrusion of external foreign objects at the same time.

At least a portion of the cover member (1100) may be formed with a metal material, for example. To be more specific, the cover member (1100) may be formed with a metal plate. In this case, the cover member (1100) may inhibit an EMI (Electromagnetic Interference). That is, the cover member (1100) may inhibit electric waves generated from outside of the cover member (1100) from entering an inside of the cover member (1100). Furthermore, the cover member (1100) may inhibit electric waves generated from inside of the cover member (1100) from being emitted to outside of the cover member (1100). However, the material of cover member (1100) is not limited thereto.

The cover member (1100) may include an upper plate (1101), an external plate (1102) and an internal plate (1103). The cover member (1100) may include an upper plate (1101) forming an upper surface, an external plate (1102) forming an external surface and an internal plate (1103) disposed on an inside to face the external plate (1102). The cover member (1100) may include an upper plate (1101), an external plate (1102) extended to a bottom side from an outside of the upper plate (1101). A bottom end of the external plate (1102) may be coupled to the base (1600). The internal plate (1103) may be formed by being extended to a bottom side from an inside of the upper plate (1101). The internal plate (1103) may be accommodated in an internal plate accommodating groove (1260) of the bobbin (1200) to inhibit the bobbin (1200) from rotating. That is, the bobbin (1200) forming the internal plate accommodating groove (1260) and the internal plate (1103) may inhibit the bobbin (1200) from rotating by allowing the bobbin (1200) to be hitched. The internal plate (1103) may be formed at each four corner portion. However, the present invention is not limited thereto. A width of the internal plate (1103) may correspond to or may be smaller than a width of the internal plate accommodating groove (1260).

The cover member (1100) may include an opening. The cover member (1100) may include an opening exposing the lens module by being formed at the upper plate (1101). The opening may be formed in a shape corresponding to that of the lens module. The size of opening may be formed greater than that of a diameter of the lens module in order to allow the lens module to be assembled through the opening. Furthermore, a light introduced through the opening may pass through the lens module. Meantime, the light having passed the lens module may be transmitted to the image sensor.

The bobbin (1200) may be movably supported to the housing (1400). The bobbin (1200) may perform an auto focusing function by moving to an optical axis direction relative to the housing (1400). The bobbin (1200) may be in a state of being accommodated in the base (1600) under an initial state where a coil of the first driving portion (1300) is not supplied with a power. That is, the bobbin (1200) may be driven to a single direction. To be more specific, the bobbin (1200) may perform an auto focusing function by moving to an upper side in response to power supply in an initial state. At this time, the upper support member (1700) and/or the bottom support member (1800) may be so designed as to apply a pressure to the bobbin (1200) to a base (1600) side in an initial state. This may be explained by offsetting a gap between an external portion (1710, 1810) of the upper support member (1700) and/or the bottom support member (1800) versus an internal portion (1720, 1820).

The bobbin (1200) may include a lens coupling portion (1210), a first driving portion coupling portion (1220), an upper side coupling portion (1230), a bottom side coupling portion (1240), a staircase portion (1250) and an internal plate accommodating groove (1260). However, any one or more of the lens coupling portion (1210), the first driving portion coupling portion (1220), the upper side coupling portion (1230), the bottom side coupling portion (1240), the staircase portion (1250) and the internal plate accommodating groove (1260) may be omitted or changed from the bobbin (1200)

The bobbin (1200) may include a lens coupling portion (1210) coupled by the lens module. The lens coupling portion (1210) may be coupled by the lens module. An inner circumferential surface of the lens coupling portion (1210) may be formed with a screw thread in a shape corresponding to that of a screw thread formed at an outer circumferential surface of the lens module. That is, the outer circumferential surface of lens module may be screw-connected to the inner circumferential surface of the lens coupling portion (1210). Meantime, an adhesive may be injected into between the lens module and the bobbin (1200). At this time, the adhesive may be an epoxy hardened by UV or heat.

The bobbin (1200) may include a first driving portion coupling portion (1220) coupled by the first driving portion (1300). The first driving portion coupling portion (1220) may be accommodated by the first driving portion (1300). The first driving portion coupling portion (1220) may be integrally formed with an external circumferential surface of bobbin (1200). Furthermore, the first driving portion coupling portion (1220) may be continuously formed along the external circumferential surface of bobbin (1200) or spaced apart from the external circumferential surface of bobbin (1200) at a predetermined distance. The first driving portion coupling portion (1220) may be formed by a portion of the external circumferential surface of bobbin (1200) being recessed.

The bobbin (1200) may include an upper side coupling portion (1230) coupled with an upper support member (1700). The upper side coupling portion (1230) may be coupled to an internal portion (1720) of the upper support member (1700). For example, a lug (not shown) of upper side coupling portion (1230) may be coupled by being inserted into a groove or a hole (not shown) of the internal portion (1720). While the lug of the upper side coupling portion (1230) is inserted into the groove or the hole of the internal portion (1720), the lug may be fused or bonded by an adhesive member to couple the upper support member (1700) to the bobbin (1200).

The bobbin (1200) may include a bottom side coupling portion (1240) coupled with the bottom support member (1800). The bottom side coupling portion (1240) may be coupled to an internal portion (1820) of the bottom support member (1800). For example, a lug (not shown) of the bottom side coupling portion (1240) may be coupled by being inserted into a groove or a hole (not shown) of the internal portion (1820). While the lug of the bottom side coupling portion (1240) is inserted into the groove or the hole of the internal portion (1820), the lug may be fused or bonded by an adhesive member to couple the bottom support member (1800) to the bobbin (1200).

An upper surface of bobbin (1200) may be formed with a staircase portion (1250) formed downwardly in a recessed manner. The staircase portion (1250) may be disposed by circumventing a circumference of an upper surface of the bobbin (1200). The staircase portion (1250) may be so formed as not to interfere with an upper side portion (1410) of the housing (1400) while the bobbin (1200) moves to an optical axis direction (vertical direction). That is, the staircase portion (1250) can secure a moving space to an upper side of the bobbin (1200). The staircase portion (1250) may be formed at an upper surface of the bobbin (1200), and may be disposed on an area where the bobbin (1200) and the upper side portion (1410) of the housing (1400) are overlapped to an optical axis direction. However, the present invention is not limited thereto, and the staircase portion (1250) may be disposed on an area where the bobbin (1200) and the upper side portion (1410) of the housing (1400) are not overlapped to an optical axis direction.

The bobbin (1200) and the upper side portion (1410) of the housing (1400) may be so formed as to allow a maximum large area to be overlapped to an optical axis direction in the second exemplary embodiment of the present invention. In this case, a foreign object may be introduced into a space between the housing (1400) and the bobbin to minimize a phenomenon of being introduced into the image sensor. For example, as illustrated in FIG. 20, the bobbin (1200) and the upper side portion (1410) of the housing (1400) may be so overlapped as to inhibit a space between the housing (1400) and the upper side portion (1410) from being viewed when viewed from an upper side.

The staircase portion (1250) may be disposed with the upper support member (1700) in the second exemplary embodiment of the present invention. Thus, the upper support member (1700) in the second exemplary embodiment may be disposed over a broader area than other exemplary embodiments where the staircase portion (1250) is not formed. This means that the connection portion (1730) of the upper support member (1700) may be more lengthily formed with a broader width.

In general, an elastic member may be manufactured through an etching process, where an etching tolerance may be about ±0.007 mm, for example. Furthermore, in case of glass photo mask, the etching tolerance may be about ±0.003 mm. Meantime, when the width of the elastic member grows broader, the stiffness of the elastic member may advantageously receive less influence of tolerance. In order help understand this theory, when a width of elastic member is manufactured with 1 mm, for example, a width of elastic member may be 1±0.007 mm when considered of tolerance, but when the width of elastic member is manufactured with 0.1 mm, the width of elastic member may be 0.1±0.007 mm when considered of tolerance. That is, when the width of the elastic member is made to be broader, dispersion of stiffness becomes smaller, and in this case, it is advantageously easy to control the dispersion of start current and sensitivity of single direction driving lens driving apparatus (1000).

However, when the width of elastic member is broad, there is a need of lengthen the length of the elastic member in order to obtain the same stiffness as in where the width is narrow over where the width is broad. In light of the fact that an accommodatable area of the upper support member (1700) can be broadened by allowing the staircase portion (1250) to be disposed by circumventing a circumference of an upper surface at the bobbin (1200) in the second exemplary embodiment, it is resultantly possible to lengthen the upper support member (1700) with a broader width. That is, the stiffness of the upper support member (1700) may receive less influence of tolerance in the second exemplary embodiment of the present invention. This means that dispersion of stiffness at the upper support member (1700) is reduced, such that it is advantageously easy to control the dispersion of start current and sensitivity in the second exemplary embodiment of the present invention, as discussed above.

The bobbin (1200) may include an internal plate reception groove (1260) into which at least one portion of the internal plate (1103) of the cover member (1100) can be accommodated. The internal plate reception groove (1260) may be formed at an upper surface of bobbin (1200). The internal plate reception groove (1260) may be formed by allowing a portion of the upper surface at the bobbin (1200) to be downwardly recessed. Recessed depth of the internal plate reception groove (1260) may be deeper than a recessed depth of staircase portion (1250). At this time, the depth may be defined by a length toward a bottom side at an upper end of the bobbin (1200). Furthermore, an upper surface of the bobbin (1200) forming the internal plate reception groove (1260) may be disposed on a bottom side over an upper surface of bobbin (1200) forming the staircase portion (1250) while the bobbin (1200) is coupled to the housing (1400). That is, the internal plate reception groove (1260) may take a shape more downwardly recessed than the staircase portion (1250). The internal plate reception groove (1260) may be accommodated by an internal plate (1103) of the cover member (1100), and the accommodated internal plate (1103) may be inhibited from being rotated because of being hitched at the bobbin (1200) forming the internal plate reception groove (1260). The internal plate reception groove (1260) may be disposed on each of four (4) corner side, for example. However, the present invention is not limited thereto.

The first driving portion (1300) may be disposed on the bobbin (1200). The first driving portion (1300) may be fixed by being inserted into a first driving portion coupling portion (1220) of bobbin (1200). For example, the first driving portion coupling portion (1220) may be formed by allowing a protruded portion to be disposed on an upper/bottom sides of recessed area. At this time, a coil of the first driving portion (1300) may be directly wound on the first driving portion coupling portion (1220). Alternatively, as another example, the first driving portion coupling portion (1220) may take an upper side or a bottom side of the recessed area being opened, and may be formed by allowing a hitching portion to be formed at the other side, and the coil of the first driving portion (1300) may be coupled by being inserted through an opened area while being in a pre-wound state.

The first driving portion (1300) may include a coil. The coil of the first driving portion (1300) may be guided to the first driving portion coupling portion (1220) to be wound on an external circumferential surface of the bobbin (1200). Furthermore, as another exemplary embodiment, the coil may be also formed with four independent coils to be disposed on the external circumferential surface of bobbin (1200), whereby adjacent coils may mutually form an angle of 90°. The first driving portion (1300) may be so disposed as to face the second driving portion (1500). The first driving portion (1300) may over the bobbin (1200) to an optical axis direction relative to the housing (1400) through an electromagnetic interaction with the second driving portion (1500). The coil of the first driving portion (1300) may include a pair of lead cables (1301, 1302). The pair of lead cables (1301, 1302) may receive a current by being electrically connected to a pair of bottom support members (1801, 1802). When a current is supplied to the coil of the first driving portion (1300), the first driving portion (1300) may be moved by electromagnetic interaction with magnets (1501, 1502) of the second driving portion (1500), and the bobbin (1200) coupled by the first driving portion (1300) may also be moved.

The housing (1400) may be disposed on an outside of the bobbin (1200). The housing (1400) may be opened at an upper side and a bottom side to movably accommodate the bobbin (1200). An inner circumferential surface of the housing (1400) may be spaced apart from an external circumferential surface of the bobbin (1200). The housing (1400) may be fixed to the base (1600), for example. However, in a modification, the housing (1400) may be movably coupled to the base (1600) through a lateral elastic member to move in order to perform the handshake correction function. The housing (1400) may be formed with an insulation material, and may be manufactured with an injection-molded material in consideration of productivity.

The housing (1400) may include an upper portion (1410), a lateral support portion (1420) and a lateral plate (1430). However, at least any one or more of the upper portion (1410), the lateral support portion (1420) and the lateral plate (1430) may be omitted or changed from the housing (1400).

The housing (1400) may include an upper portion (1410) supporting an upper surface of the second driving portion (1500). The upper portion (1410) may form an upper surface of housing (1400) to support an upper surface of the second driving portion (1500). The upper portion (1410) may include, at an inside thereof, a through hole (1411). A light incident through the through hole (1411) may be incident on the lens module. The upper portion (1410) may be overlapped on at least a portion with the bobbin (1200) toward an optical axis direction. The upper portion (1410) may be formed in such a manner that a discrete space formed between an inner circumferential surface of the housing (1400) and an external circumferential surface of the bobbin (1200) is not seen when viewed from an upper side of the housing (1400). In this case, a phenomenon of foreign object being introduced through a discrete space between the housing (1400) and the bobbin (1200) can be minimized.

The upper portion (1410) may function as a mechanical stopper relative to the bobbin (1200). That is, the upper portion (1410) may not contact the bobbin (1200) while moving by auto focusing function of the bobbin (1200), and may restrict a moving limit to an upper side direction of the bobbin (1200) when the bobbin (1200) moves by an external shock. Alternatively, the upper portion (1410) may function as a stopper contacting the bobbin (1200) while moving by auto focusing function of bobbin (1200). However, when the upper portion (1410) performs a stopper function relative to the bobbin (1200), there is a high probability of generating a foreign object by being ground during reliability test, and therefore, if necessary, a stopper portion may be also formed between an internal plate (1103) of the cover member (1100) and the bobbin (1200). That is, a portion of an internal plate reception groove (1260) of bobbin (1200) may contact an end of the internal plate (1103) of cover member (1100) to allow realizing a stopper function.

The upper portion (1410) may include four (4) corner portions, for example. That is, a shape of the upper portion (1410) may be rectangular. Each of the four corner portions at the upper portion (1410) may be disposed with a lateral support member (1420) extended to a bottom side.

The housing (1400) may include a lateral support portion (1420) extended downwardly from the upper portion (1410) to support a lateral surface of the second driving portion (1500). The lateral support portion (1420) may include first to fourth support portions (1421, 1422, 1423, 1424)

extended downwardly from each of four corner portions of the upper portion (1410). At this time, the first support portion (1421) may be adjacent to the fourth support portion (1424) and the second support portion (1422) and the third support portion (1423) may be adjacent to the second support portion (1422) and the fourth support portion (1424). That is, the first to fourth support portions (1421, 1422, 1423, 1424) may be continuously arranged to a clockwise direction or to a counterclockwise direction.

A second driving portion (1500) may be interposed between the first support portion (1421) and the second support portion (1422) and between the third support portion (1423) and the fourth support portion (1424). Meantime, a lateral plate (1430) may be interposed between the second support portion (1422) and the third support portion (1423) and between the fourth support portion (1424) and the first support portion (1421). That is, two second driving portions (1500) and two lateral plates (1430) may be coupled to the lateral support portion (1420). At this time, the two driving portions (1500) may face each other. Furthermore, two lateral plates (1430) may also face each other.

The lateral support portion (1420) may include a recess portion (1426) recessed from a bottom end of the lateral support portion (1420) to an upper side. The recess portion (1426) may be disposed with an extension portion (1620) of the base (1600). The recess portion (1426) may be formed in a shape corresponding to that of the extension portion (1620). That is, the lateral support portion (1420) may be formed on at least one portion thereof with a shape corresponding to that of the extension portion (1620) of the base (1600). The lateral support portion (1420) may be further securely coupled by coupling between the recess portion (1426) and the extension portion (1620). Particularly, when the recess portion (1426) is disposed on an outside of the lateral support portion (1420), and when the extension portion (1620) is accommodated into the recess portion (1426), the extension portion (1620) may be resulted in supporting an outside of the lateral support portion (1420), whereby the housing (1400) can be minimized of a phenomenon where the housing (1400) is detached to an outside direction even if there is an external shock.

The lateral support portion (1420) may include a coupling lug (1427) protrusively formed from a bottom end of the lateral support portion (1420) to a bottom side. The coupling lug (1427) may be protrusively formed from a bottom end of the lateral support portion (1420) to a bottom side. The coupling lug (1427) may be accommodated into a coupling groove (1630) of the base (1600). The coupling lug (1630) may be fastened to a groove formed at an external portion (1810) of the bottom support portion (1800).

The lateral support portion (1420) may include a support end (1425) supporting a portion of an internal surface of the second driving portion (1500). The support end (1425) may support a portion of the internal surface of the second driving portion (1500) to inhibit the second driving portion (1500) from being deviated into an inside. Furthermore, at least one portion of an internal surface at the support end (1425) may support to allow being opened to an inside, whereby an influence is minimized to the electromagnetic interaction between the second driving portion (1500) and the first driving portion (1300).

The lateral plate (1430) may include a first plate (1431) integrally formed with a second support portion (1422) and a third support portion (1423), and a second plate (1432) integrally formed with a fourth support portion (1424) and a first support portion (1421). The lateral plate (1430) may be integrally formed with the lateral support portion (1420)

to thereby minimize a phenomenon where foreign objects are introduced from a lateral side of the housing (1400). Meantime, as a modification, when the second driving portion (1500) is formed with four pieces, the lateral plate (1430) may be omitted.

The second driving portion (1500) may be disposed to face the first driving portion (1300). The second driving portion (1500) can move the first driving portion (1300) through electromagnetic interaction with the first driving portion (1300). The second driving portion (1500) may include magnets. The second driving portion (1500) may include two magnets, for example. The second driving portion (1500) may include a first magnet (1501) and a second magnet (1502), for example, as illustrated in FIG. 16. At this time, the first magnet (1501) and the second magnet (1502) may be so disposed as to face each other. As noted here, when two magnets are disposed, two surfaces of four lateral surfaces of the housing (1400) may be disposed with the lateral plate (1430) to minimize a phenomenon where foreign objects are introduced from a lateral side of the housing (1400).

The second driving portion (1500) may include four magnets in a modification, as illustrated in FIG. 22. At this time, four magnets may be disposed on the housing (1400) by being independently arranged to form 90° between adjacent two magnets. That is, each of the four magnets is disposed on each lateral surface of four lateral corners of the housing (1400) to promote an efficient use of internal volume.

The second driving portion (1500) may be disposed on the housing (1400). The second driving portion (1500) may be fixed by being inserted into the housing (1400). To be more specific, an upper surface of the second driving portion (1500) may be supported to an upper portion (1410) of the housing (1400), and a lateral surface may be supported by the lateral support portion (1420) of the housing D (1400). Furthermore, a bottom surface of the second driving portion (1500) may be supported by the base (1600). An upper support member (1700) may be interposed between second driving portion (1500) and the upper portion (1410). An adhesive may be interposed between the second driving portion (1500) and the housing (1400) and/or the base (1600).

Meantime, as a modification, the first driving portion (1300) may include magnets, and the second driving portion (1500) may include a coil.

The base (1600) may support a bottom side of the housing (1400). The base (1600) may be coupled with the housing (1400). The base (1600) may be coupled with the cover member (1100). The base (1600) may be coupled with an external plate (1102) of the cover member (1100). At least one portion of the external surface at the base (1600) may contact an inner surface of external plate (1102) of the cover member (1100). A bottom end of the base (1600) may be formed with a lug protruded to an outside to support a bottom end of the external plate (1102) of the cover member (1100).

The base (1600) may include a bottom portion (1610), an extension portion (1620) and a coupling groove (1630). However, any one or more of the bottom portion (1610), the extension portion (1620) and the coupling groove (1630) may be omitted or changed from the base (1600).

The base (1600) may include a bottom portion (1610) supporting the housing (1400). The bottom portion (1610) may support a bottom end of the lateral support portion (1420) of the housing (1400). The bottom portion (1610) may include, at an inside, a through hole (1611). A light having passed the lens module through the through hole (1611) may reach the image sensor disposed on a bottom side of the base (1600). The bottom portion (1610) may include, at a portion supporting the lateral support portion (1420) of housing (1400), a coupling groove (1630). Meantime, a bottom end of the lateral support portion (1420) may be formed with coupling lug (1427) inserted into the coupling groove (1630). The coupling lug (1427) may be coupled with a hole formed at the external portion (1810) of the bottom support member (1800). That is, the bottom support member (1800) may be interposed between a bottom portion (1610) of the base (1600) and the lateral support portion (1420) of the housing (1400). Meantime, the bottom support member (1800) may be fixed by being coupled to the coupling lug (1427) of the lateral support portion (1420) inserted into the coupling groove (1630) of the bottom portion (1610). The bottom portion (1610) may include a terminal receptor (1612) formed by being recessed inwardly on the lateral surface. The terminal receptor (1612) may accommodate a terminal portion (1811) of the bottom support member (1800).

The base (1600) may include an extension portion (1620) extended to an upper side in order to face the lateral support portion (1420). The extension portion (1620) may be extended from the bottom portion (1610) to an upper side. The extension portion (1620) may be formed at each of the four corner portions of the bottom portion (1610). The extension portion (1620) may be inserted into a recess portion (1426) of the lateral support portion (1420). For example, the recess portion (1426) may be formed at an outside of the lateral support portion (1420), and in this case, the extension portion (1620) may be inserted into the recess portion (1426) to support an external side of the lateral support portion (1420) whereby the housing (1400) may be inhibited from being disengaged to an external side of the base (1600).

The base (1600) may include a coupling groove (1630) accommodated by the coupling lug (1427) of the lateral support portion (1420). The coupling groove (1630) may be so formed as to correspond to the coupling lug (1427) in terms of shape. For example, the coupling lug (1427) may take a cylindrical shape, and the coupling groove (1630) may also take a corresponding shape. However, the present invention is not limited thereto. The coupling groove (1630) may be formed at a portion of an area contacted by the bottom portion (1610) of the base and the lateral support portion (1420) of the housing (1400). Meantime, the coupling lug may be formed at the base (1600) and the coupling groove may be formed at a bottom end of the lateral support portion (1420).

The upper support member (1700) may be interposed between an upper portion (1410) of the housing (1400) and the second driving portion (1500). A portion of the upper support member (1700) may be fixed by a coupling force of the second driving portion (1500) coupled to the housing (1400). Furthermore, a portion of the upper support member (1700) may be fixed to the housing (1400) and/or the second driving portion (1500) by being adhered by an adhesive.

The upper support member (1700) may include an elastic member. That is, at least one portion of the upper support member (1700) may have elasticity. In this case, the upper support member (1700) may be called an upper elastic member. The upper support member (1700) may be a leaf spring, for example. However, the present invention is not limited thereto. At least one portion of the upper support member (1700) may take a shape corresponding to that of the lateral support portion (1420), through which the upper support portion (1700) may accommodate at least one portion of the lateral support portion (1420). Meantime, in this case, when an external force is applied to the upper support portion (1700), the upper support portion (1700) may be inhibited from rotating by being hitched at the lateral support portion (1420).

The upper support member (1700) may include an external portion (1710), an internal portion (1720) and a connection portion (1730). The upper support member (1700) may include an external portion (1710) supported by the housing (1400), an internal portion (1720) coupled with the bobbin (1200), and a connection portion (1730) connecting the external portion (1710) and the internal portion (1720). At this time, the connection portion (1730) of the upper support member (1700) may have elasticity. It should be also apparent that the entire of the upper support member (1700) may have elasticity.

At least a portion of the upper support member (1700) may include an external portion (1710) interposed between the upper portion (1410) and the second driving portion (1500). At least a portion of the external portion (1710) may be interposed between the upper portion (1410) and the second driving portion (1500). The external portion (1710) may surface-contact the housing (1400) at one surface thereof, and may surface-contact the second driving portion (1500) at the other surface. The external portion (1710) may be fixed between the second driving portion (1500) and the upper portion (1410) by a force coupled by the second driving portion (1500) to the housing (1400).

The external portion (1710) may include a first external terminal (1711) interposed between the first support portion (1421) and the second support portion (1422), a second external terminal (1712) interposed between the second support portion (1422) and the third support portion (1423), a third external terminal (1713) interposed between the third support portion (1423) and the fourth support portion (1424) and a fourth external terminal (1714) interposed between the fourth support portion (1424) and the first support portion (1421).

The upper support member (1700) may include an internal portion (1720) coupled to an upper surface of bobbin (1200). The internal portion (1720) may be coupled to an upper surface of bobbin (1200). The internal portion (1720) may be formed with a hole, and the bobbin (1200) may be formed with a lug corresponding to the hole. The internal portion (1720) may be coupled to the bobbin (1200) by being fused by heat while the lug of the bobbin (1200) is inserted into the hole of the internal portion (1720). The internal portion (1720) may be connected to the external portion (1710) through the connection portion (1730).

The internal portion (1720) may include a first internal terminal (1721) facing a first external terminal (1711), a second internal terminal (1722) facing a second external terminal (1712), a third internal terminal (1723) facing a third external terminal (1713) and a fourth internal terminal (1724) facing a fourth external terminal (1714). That is, the internal portion (1720) may include a first internal terminal (1721) corresponding to between the first support portion (1421) and a second support portion (1422), a second internal terminal (1722) corresponding to between the second support portion (1422) and the third support portion (1423), a third internal terminal (1723) corresponding to between the third support portion (1424), and a fourth internal terminal (1724) corresponding to between the fourth support portion (1424) and the first support portion (1421).

The connection portion (1730) may include a first connection body (1731*a*) connecting between the second internal terminal (1722) and the third internal terminal (1723) and the first external terminal (1711) as illustrated in FIG. 20, for example. Furthermore, the connection portion (1730) may further include a second connection body (1732*a*) connecting between the third internal terminal (1723) and the fourth internal terminal (1724) and the second external terminal (1712). In this case, the second external terminal (1712) may be fixed to the housing (1400) by an adhesive. Meantime, the first connection body (1731*a*) and the second connection body (1732*a*) illustrated in FIG. 20 can be ascertained to be longer in length than a first connection body (1731*b*) and a second connection body (1732*b*) of FIG. 21, which are modifications. That is, the first connection body (1731*a*) and the second connection body (1732*a*) illustrated in FIG. 20 are used with a broader width than the first connection body (1731*b*) and the second connection body (1732*b*) of FIG. 21, which are modifications, in order to show the same stiffness as that of the first connection body (1731*b*) and the second connection body (1732*b*) of FIG. 21. That is, there is an advantage of receiving less manufacturing error in the exemplary embodiment of FIG. 20.

The connection portion (1730) may include a first connection body (1731*b*) connecting between the first external terminal (1711) and the second internal terminal (1722), and a second connection body (1732*b*) connecting the first external terminal (1711) and the fourth internal terminal (1724), as a modification, as illustrated in FIG. 21. In this case, the connection portion (1730) may not be directly connected to the second external terminal (1722). Meantime, this modification has an advantage of dispensing with fixation of the second external terminal (1712) and the fourth external terminal (1714) to the housing (1400) using an adhesive, in comparison with an exemplary embodiment of FIG. 20.

The adhesive (not shown) may be interposed between the external portion (1710) and the upper portion (1410). Alternatively, the adhesive may be interposed between the external portion (1710) and the second driving portion (1500). That is, the adhesive may be interposed between the external portion (1710) and the upper portion (1410) or between the external portion (1710) and the second driving portion (1500).

One portion of the bottom support member (1800) may be coupled to the housing (1400) or to the base (1500), and the other portion may be coupled to a bottom surface of the bobbin (1200). One portion of the bottom support member (1800) may be fixed by the coupling lug (1427) disposed on a bottom end of the lateral support portion (1420) at the housing (1400). One portion of the bottom support member (1800) may be interposed between the lateral support portion (1420) of the housing (1400) and the base (1600). The bottom support member (1800) may movably support the bobbin (1200) relative to the housing (1400) and/or the base (1500).

The bottom support member (1800) may be so formed as to apply a pressure on the bobbin (1200) to a bottom side during an initial state where no current is applied to the first driving portion (1300). Furthermore, the upper support member (1700) may be so formed as to apply a pressure on the bobbin (1200) to a bottom side during an initial state where no current is applied to the first driving portion (1300), whereby the bobbin (1200) can maintain a state of being contacted to the base (1600) under the initial state. That is, an auto focusing function can be performed through a single direction driving according to the second exemplary embodiment of the present invention. The bottom support member (1800) may be formed in a pair of bottom support members (1801, 802). The bottom support member (1800) may be formed with a pair, where each can be connected to the coil of the first driving portion (1300).

The bottom support member (1800) may include an elastic member, for example. That is, at least one portion of the bottom support member (1800) may have elasticity. In this case, the bottom support member (1800) may be called a bottom elastic member. The bottom support member (1800) may be a leaf spring, for example. However, the present invention is not limited thereto.

The bottom support member (1800) may include an external portion (1810), an internal portion (1820) and a connection portion (1830).

The bottom support member (1800) may include an external portion (1810) connected to any one or more of the housing (1400) and the base (1600). The external portion (1810) may be coupled to any one or more of the housing (1400) and the base (1600). The external portion (1810) may be fixed by a coupling lug (1427) at the lateral support portion (1420). The external portion (1810) may include a hole inserted by the coupling lug (1427) of the lateral support portion (1420).

Each of the pair of bottom support members (1801, 802) may include a terminal portion (1811) downwardly bent to be accommodated into a terminal receptor (1612) of the base (1600). The terminal portion (1811) may be extended by being bent from the external portion (1810). At least one portion of the terminal portion (1811) may be accommodated into the terminal receptor (1612) of the base (1600). The terminal portion (1811) may be applied with a banding spring terminal manufactured by banding method.

The bottom support member (1800) may include an internal portion (1820) coupled to the bobbin (1200). The internal portion (1820) may be coupled to the bobbin (1200). The internal portion (1820) may include a hole and the bobbin (1200) may include a lug. In this case, the hole of internal portion (1820) may be coupled by being inserted by the lug of the bobbin (1200). The internal portion (1820) may be coupled and bonded by heat to the bobbin (1200) while the hole of the internal portion (1820) is inserted with the lug of the bobbin (1200).

The bottom support member (1800) may include a connection portion (1830) connecting the external portion (1810) and the internal portion (1820). The connection portion (1830) may include an external portion (1810) and an internal portion (1820). The connection portion (1830) may have elasticity. It should be apparent that the external portion (1810), the internal portion (1820) and the connection portion (1830) all have the elasticity.

The second exemplary embodiment and the modification may be such that assembling of housing assembly can be performed by a process where the cover member (1100) is accommodated, the housing (1400) is disposed inside the cover member (1100) as illustrated in FIG. 23(*a*), the upper support member (1700) is accommodated on the housing (1400) as illustrated in FIG. 23(*b*), and the magnet of the second driving portion (1500) is fastened as illustrated in FIG. 23(*c*).

The second exemplary embodiment of the present invention has an advantage over the prior art because of elimination of a fixing process such as a bonding or fusing process for fixing the upper support member (1700) to the housing (1400). Furthermore, there is another advantage in the second exemplary embodiment of the present invention in that assembly is easy over a case of assembling the housing (1400) at a lateral side because the magnet can be assembled at a vertical direction of the housing (1400).

In the second exemplary embodiment of the present invention, magnets are positioned only at two lateral surfaces out of four lateral surfaces of the housing (1400) and the other remaining two lateral surfaces are positioned with the lateral plates (1430), for example, to thereby reduce a risk of being introduced with foreign objects to the lateral surface of the housing (1400).

Meantime, as an example, when the upper support member (1700) is used as shown in FIG. 20, the length of the upper support member (1700) can be extended and the width can be broadly utilized to thereby minimize the influence of stiffness caused by manufacturing tolerance. Furthermore, as a modification, when the upper support member (1700) is used as illustrated in FIG. 21, the external portion (1810) not directly connected by the connection portion (1830) may be advantageously dispensed with the bonding process in which the external portion (1810) is separately bonded to the housing (1400).

The inner diameter of the housing (1400) may be made to be smaller than the external diameter of the bobbin (1200) to minimize the infiltration of foreign objects into an upper side according to the second exemplary embodiment of the present invention.

Furthermore, the manufacturing personnel employed for housing assembly can be reduced to a total of six people according to the second exemplary embodiment of the present invention. That is, the housing assembly can be accomplished by employing one person for accommodation of cover member (1100), one person for accommodation of housing (1400), one person for accommodation of upper support member (1700), one person for coating bond, one person for assembly of magnet, and one person for additional coating of bond. Furthermore, the second exemplary embodiment of the present invention can expect advantageous effects of reducing the jig cost over the prior art, reducing the manufacturing cost of housing (1400) and the magnets over the prior art and reducing the sub assembly defect loss over the prior art.

Although the present invention has been explained with all constituent elements forming the exemplary embodiments of the present disclosure being combined in one embodiment, or being operated in one embodiment, the present disclosure is not limited thereto. That is, in some cases, the described features, structures, or operations may be combined in any suitable manner in one or more embodiments. It will also be readily understood that the components of the embodiments, as generally described and illustrated in the figures herein, could be arranged and designed in a wide variety of different configurations.

Terms used in the specification are only provided to illustrate the embodiments and should not be construed as limiting the scope and spirit of the present disclosure. In the specification, a singular form of terms includes plural forms thereof, unless specifically mentioned otherwise. In the term "includes", "including", "comprises" and/or "comprising" as used herein, the mentioned component, step, operation and/or device is not excluded from presence or addition of one or more other components, steps, operations and/or devices.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Although the abovementioned embodiments according to the present invention have been described in detail with reference to the above specific examples, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A lens driving device, comprising:
a base;
a cover member comprising an upper plate and a lateral plate coupled with the base;
a bobbin disposed in the cover member;
a housing disposed between the bobbin and the cover member;
a coil disposed on the bobbin;
a magnet disposed between the bobbin and the lateral plate of the cover member; and
an upper elastic member coupled with the bobbin,
wherein the upper elastic member comprises an inner portion coupled with the bobbin, an outer portion, and a connection portion connecting the inner portion and the outer portion,
wherein an upper surface of the outer portion of the upper elastic member is directly contacted with the housing,
wherein a lower surface of the outer portion of the upper elastic member is directly contacted with the magnet, and
wherein the magnet is disposed between the base and the housing.

2. The lens driving device of claim 1, wherein the upper surface of the outer portion of the upper elastic member is directly attached to the housing by an adhesive, and
wherein the lower surface of the outer portion of the upper elastic member is directly attached to the magnet by an adhesive.

3. The lens driving device of claim 1, wherein the housing comprises an upper portion disposed between the upper plate of the cover member and the magnet, and a lateral portion downwardly extending from the upper portion of the housing.

4. The lens driving device of claim 3, wherein the base comprises an extension portion upwardly protruding from an upper surface of the base,
wherein the upper surface of the base comprises a first corner area and a second corner area disposed diagonally from each other,
wherein the extension portion of the base comprises a first extension portion formed on the first corner area of the base and a second extension portion formed on the second corner area of the base, wherein the lateral portion of the housing comprises a first lateral portion disposed corresponding to the first corner area of the base, wherein at least a portion of the first extension portion is overlapped with the lateral plate of the cover member and the first lateral portion of the housing in a first direction, and wherein the first direction faces from the second extension portion to the first extension portion and is perpendicular to an optical axis direction.

5. The lens driving device of claim 1, wherein an upper surface of the magnet comprises a first area directly contacted with the outer portion of the upper elastic member, and a second area non-overlapped with the outer portion of the upper elastic member in an optical axis direction.

6. The lens driving device of claim 1, wherein the outer portion of the upper elastic member is fixed by a coupling force of the magnet coupled to the housing.

7. The lens driving device of claim 1, wherein the outer portion of the upper elastic member comprises first to fourth outer portions, wherein the magnet comprises a first magnet and a second magnet opposite to the first magnet, wherein the first outer portion of the upper elastic member is disposed between the first magnet and the upper portion of the housing, and wherein the second outer portion of the upper elastic member is disposed between the second magnet and the upper portion of the housing.

8. The lens driving device of claim 7, wherein the upper elastic member comprises a first portion connecting the first outer portion and the third outer portion, a second portion connecting the first outer portion and the fourth outer portion, a third portion connecting the second outer portion and the third outer portion, and a fourth portion connecting the second outer portion and the fourth outer portion.

9. The lens driving device of claim 1, comprising a lower elastic member coupled with the bobbin and disposed below the upper elastic member, wherein the lower elastic member comprises two elastic units electrically coupled with the coil, wherein the upper elastic member is integrally formed as one body, and wherein the inner portion of the upper elastic member is adhered to the bobbin by an adhesive.

10. The lens driving device of claim 3, wherein the lateral portion of the housing is formed at each of four corners of the upper portion of the housing.

11. The lens driving device of claim 4, wherein the lateral plate of the cover member comprises a first corner area and a second corner area disposed diagonally from each other, and a third corner area and a fourth corner area disposed diagonally from each other, wherein the lateral portion of the housing comprises a second lateral portion disposed on the third corner area, wherein the magnet comprises a first magnet disposed between the first lateral portion of the housing and the second lateral portion of the housing, wherein the outer portion of the upper elastic member comprises a first area overlapped with the first magnet in the optical axis direction.

12. The lens driving device of claim 11, wherein the first area of the upper elastic member is disposed between the first lateral portion of the housing and the second lateral portion of the housing in a direction perpendicular to the optical axis direction.

13. The lens driving device of claim 1, wherein the magnet is directly contacted with the cover member.

14. The lens driving device of claim 1, wherein the magnet is fixed by the cover member and the housing.

15. A camera module, comprising:
a printed circuit board (PCB);
an image sensor disposed on the PCB;
the lens driving device of claim 1; and
a lens coupled to the bobbin of the lens driving device and disposed at a position corresponding to that of the image sensor.

16. An optical apparatus, comprising:
a main body;
the camera module of claim 15 disposed on the main body; and
a display.

17. A lens driving device, comprising:
a base;
a cover member comprising an upper plate and a lateral plate coupled with the base;
a bobbin disposed in the cover member;
a housing disposed between the bobbin and the cover member;
a coil disposed on the bobbin;
a magnet disposed between the bobbin and the lateral plate of the cover member; and
an upper elastic member coupled with the bobbin,
wherein the upper elastic member comprises an inner portion coupled with the bobbin, an outer portion, and a connection portion connecting the inner portion and the outer portion,
wherein an upper surface of the outer portion of the upper elastic member is directly attached to the housing by an adhesive,
wherein a lower surface of the outer portion of the upper elastic member is directly attached to the magnet by an adhesive, and
wherein the magnet is disposed between the base and the housing.

18. The lens driving device of claim 17, wherein the housing comprises an upper portion disposed between the upper plate of the cover member and the magnet, and a lateral portion downwardly extending from the upper portion of the housing.

19. The lens driving device of claim 18, wherein the base comprises an extension portion upwardly protruding from an upper surface of the base, wherein the upper surface of the base comprises a first corner area and a second corner area disposed diagonally from each other, wherein the extension portion of the base comprises a first extension portion formed on the first corner area of the base and a second extension portion formed on the second corner area of the base, wherein the lateral portion of the housing comprises a first lateral portion disposed corresponding to the first corner area of the base, wherein at least a portion of the first extension portion is overlapped with the lateral plate of the cover member and the first lateral portion of the housing in a first direction, and wherein the first direction faces from the second extension portion to the first extension portion and is perpendicular to an optical axis direction.

20. The lens driving device of claim 17, wherein an upper surface of the magnet comprises a first area directly contacted with the outer portion of the upper elastic member, and a second area non-overlapped with the outer portion of the upper elastic member in an optical axis direction.

* * * * *